US010643246B1

(12) United States Patent
Suprasadachandran Pillai

(10) Patent No.: US 10,643,246 B1
(45) Date of Patent: May 5, 2020

(54) METHODS AND SYSTEMS FOR CUSTOMIZATION OF USER PROFILES

(71) Applicant: Amazon Technologies, Inc., Seattle, WA (US)

(72) Inventor: Syama Prasad Suprasadachandran Pillai, Bangalore (IN)

(73) Assignee: Amazon Technologies, Inc., Reno, NV (US)

( * ) Notice: Subject to any disclaimer, the term of this patent is extended or adjusted under 35 U.S.C. 154(b) by 375 days.

(21) Appl. No.: 15/473,065

(22) Filed: Mar. 29, 2017

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0269* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 2007/0293958 A1* | 12/2007 | Stehle | ................... | G06Q 10/04 700/30 |
| 2008/0167966 A1* | 7/2008 | Ramsdale | .............. | G06Q 20/20 705/18 |
| 2012/0151514 A1* | 6/2012 | Kandanala | ......... | H04N 5/44543 725/23 |
| 2014/0089327 A1* | 3/2014 | Pavlidis | ................. | G06Q 30/02 707/749 |
| 2014/0150005 A1* | 5/2014 | Kalmes | ............ | H04N 21/25866 725/14 |
| 2014/0164404 A1* | 6/2014 | Hunt | .................... | G06F 16/9535 707/754 |
| 2015/0186892 A1* | 7/2015 | Zhang | .............. | G06Q 20/40145 705/44 |
| 2015/0221018 A1* | 8/2015 | Kopikare | .............. | H04W 8/005 705/26.8 |
| 2016/0078489 A1* | 3/2016 | Hu | ...................... | G06Q 30/0269 705/14.66 |
| 2016/0225010 A1* | 8/2016 | Patel | .................... | G06Q 20/325 |

* cited by examiner

*Primary Examiner* — Matthew T Sittner
(74) *Attorney, Agent, or Firm* — Eversheds Sutherland (US) LLP

(57) ABSTRACT

Systems, methods, and computer-readable media are disclosed for customization of user profiles. The systems, methods, and computer-readable media described herein may improve user experiences and speed of operation. In an example embodiment described herein, a method may include providing to a first device from a second device, data associated with a first user account, the data associated with the first user account comprising first user profile data for a first user profile associated with the first user account, wherein the first user profile data comprises first historical data, first one or more recommended products, or first one or more user preferences and second user profile data for a second user profile associated with the first user account, wherein the second user profile data comprises second historical data, second one or more recommended products, or second one or more user preferences.

17 Claims, 14 Drawing Sheets

METHODS AND SYSTEMS FOR CUSTOMIZATION OF USER PROFILES

BACKGROUND

Electronic devices are now an integral part of everyday life. Many of the electronic devices that are widely used are mobile devices (e.g., mobile phones, laptops, tablets, and/or the like). Users may use such devices to browse audio and/or visual (audiovisual) content and for online shopping. However, many challenges face users during an online shopping experience. For example, a user may receive product suggestions and/or advertisements that are not currently relevant to the user. Such actions may lead to a poor customer experience as well as increase the computational load on both server resources and network bandwidth utilized by the user seeking relevant suggestions and/or advertisements.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
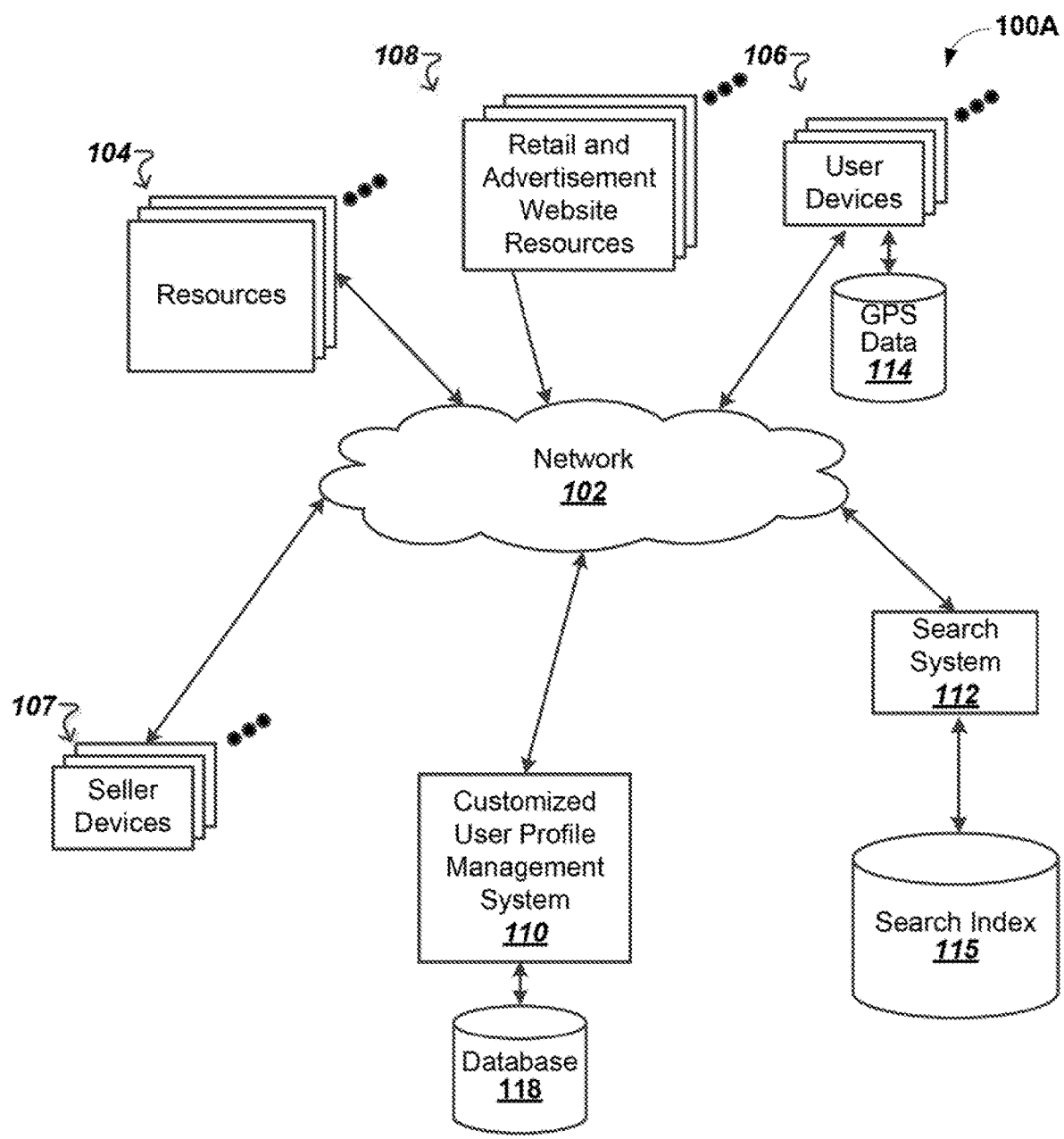
FIG. 1 illustrates an environment where one or more devices may operate in accordance with one or more example embodiments of the disclosure.

This disclosure relates to, among other things, systems, methods, computer-readable media, techniques, and methodologies for creating, activating and using customized user profiles.

Generally, a user profile may be used to adhere to user preferences, provide relevant product suggestions and/or advertisements, provide special promotions and/or the like. A user may be able to customize one or more user profiles with particular preferences and/or interests. In one example, a user may provide user input indicative of interest in biking. Such data may be identified and stored in association with a respective user profile. In a different example, a user may browse multiple products associated with biking. A customized user profile management system may then identify incidents associated with browsing products related to biking. For example, the customized user profile management system may determine a count of page visits associated with biking. In turn, the customized user profile management system may automatically determine that the user is interested in biking or products belonging to a biking vertical. The customized user profile management system may be stored data indicative of the user interest in biking, in association with a respective user profile.

In one example, a user device may provide login credentials associated with a particular account to an online retail service. In one example, the login credentials may include a login name and a login password. The online retail service may determine whether the login credentials are valid. In turn, the online retail service may allow the user device access to information associated with the particular account.

Once the user device is granted access to the account, the user device may create one or more customized user profiles and/or select a user profile for activation. For example, a user may create a first profile associated with work purchases and a second profile associated with private purchases. The user may be an author and an expecting mother. Therefore the user may create a first user profile associated with interest in books and/or novels and a second profile associated with pregnancy products. In one example, the user may select to activate the first account. While the first user profile is activated, actions performed by the user may be analyzed and stored in association with the first user profile. Similarly, while the second user profile is activated, actions performed by the user may be analyzed and stored in association with the second user profile. The customized user profile management system may automatically determine based on the action and analysis associated with the first user profile that is the first profile is associated with books and/or novels. Similarly, the customized user profile management system may automatically determine based on the action and analysis associated with the second user profile that the second user profile is associated with an expecting mother and/or a pregnancy.

In one example, different preferences may be stored in association with each of the first user profile and the second user profile. For example, the first user profile may be linked to a particular mobile device (tablet, mobile phone and/or the like). The second user profile may be linked to a second mobile device different from the particular mobile device. In one example, the second user profile may be associated with a preference of receiving advertisements and/or promotions as push notifications to the second mobile device. Accordingly, the user may receive push notifications associated with being an expecting mother at the second device only. Similarly, the first device may receive push notifications associated with the users work persona. In some implementations, the customized user profile management system may determine that a threshold period of time lapsed after classifying the second user profile as being associated with an expected mother. In one example, the customized user profile management system may determine that 9-month lapsed after classifying the second user profile as being associated with an expected mother. In turn, the customized user profile management system may de-classify or un-associate the second user profile as being associated with an expecting mother.

Other preferences associated with each of the first and second user profiles may also be provided by the user device based on user input. In one example, a first spending limit for the first user profile and a second spending limit for the second user profile may be provided by the user device. The customized user profile management system may then enforce the spending limits for the first and second user profiles. In one example, the spending limit for the first account may be $500 and the spending limit for the second account may be $100. In a different example, the first account may have no spending limit while the second account spending limit may be $54.

In one example, GPS data may be provided to the customized user profile management system in association with a first account. The first account may be associated with a first customized user profile associated with a first location and a second customized user profile associated with a second location. For example, with reference to the above, the work user profile associated with novels and/or books may be also associated with an office location. Similarly, the expecting mother user profile may be associated with a residence location. Accordingly, the user device may provide GPS location information to the customized user profile management system. The customized user profile management system may 110 whether the user device is located proximate to the office location or the residence location. The customized user profile management system may automatically activate the first user profile when the user device is determined to be located proximate to the office location. Similarly, the customized user profile management system may automatically activate the first user profile when the user device is determined to be located proximate to the office location.

FIG. 1 is a block diagram of an example environment 100 in which a customized user profile management system may operate. For example, the environment 100 includes a plurality of user devices 106 that may access retail and advertisement website resources 108. The example environment 100 also includes a network 102, such as a local area network (LAN), a wide area network (WAN), the Internet, or a combination thereof. The network 102 connects resources 104, user devices 106 and seller devices 107, customized user profile management system 110, and the search system 112. The example environment 100 may include many thousands of resources 104 (e.g., information, audio, visual and/or the like).

The resources 104 may be associated with domain names and hosted by one or more servers. For example, a website may be one or more resources 104 hosted by one or more servers. A website may also be one or more informational resources such as product detail pages, search resources, and/or the like and/or audiovisual resources hosted such as audio and/or visual advertisements and/or the like by one or more servers. Still a website may be a combination of informational and audio/visual resources hosted by one or more servers. In one example, the audiovisual resources may be advisements. An example website may be a collection of web pages formatted in hypertext markup language (HTML) that can contain text, images, multimedia content, and programming elements, such as scripts. Each website may be maintained by a publisher, which is an entity that controls, manages and/or owns the website.

A resource 104 may be any data that can be provided over the network 102. A resource is identified by a resource address that is associated with the resource. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser or a dedicated web-based application and/or a dedicated mobile platform application, to facilitate the sending and receiving of data over the network 102.

A user device 106 can request resources 104 and retail and advertisement website resources 108 from websites. In turn, data representing these resources can be provided to the user device 106 for presentation by the user device 106. The data representing the resources can also include data specifying a portion of the resource or a portion of a user display (e.g., a presentation location of a pop-up window or in a specified area of a web page) in which advertisements can be presented.

To facilitate searching of these resources, the environment 100 can include a search system 112 that identifies the resources by crawling and indexing the resources provided by the publishers on websites. Data about the resources can be indexed based on the resource to which the data corresponds. The indexed and, optionally, cached copies of the resources are stored in a search index 115. In some implementations, the search system 112 may be for searching resources hosted by a specific publisher. For example, a search system 112 may search for a retail publisher of the retail and advertisement website resources 108. In some examples, the retail publisher may have a dedicated search system for resources hosted on servers belonging to the retail publisher. Such search systems may crawl and index resources hosted by servers belonging to the publisher.

In some implementations, user devices 106 receive and store global positioning system (GPS) data. For example, user devices 106 may receive data from one or more satellites to enable the user devices to determine their current location and/or orientation. This data may be stored in association with time stamps. The stored data may be used to determine the location of user devices 106 at a time a specific action was performed. For example, the GPS data on a user device 106 may be used to determine the location of the user device 106 when customized gaming content was generated by the user device 106. GPS data 114 may be collected by the user devices 106 and provided to an advertisement targeting system (not shown). The advertisement targeting system may then utilize the GPS data to provide location based advertisements to the user devices 106. The GPS data 114 may be stored in association with a customer account by customized user profile management system 110. The GPS data may be used to automatically select and activate a customized user profile.

The retail website associated with retail and advertisement website resources may receive advertisements from seller devices 107, for presentation on user devices 106 when browsing retail and advertisement website resources 108. The seller devices may be servers dedicated for providing advertisements. In some implementations, the seller devices may provide data associated with products to be sold through the retail website. In turn, the products and/or advertisements may be provided for display at user devices 106.

The customized user profile management system 110 may monitor access of the retail and advertisement website resources 108, by user devices 106. User devices 106 may be respectively associated with different account numbers or identifiers and/or customized profiles. User interactions with the retail and advertisement website resources 108 may also be monitored by the customized user profile management system 110. The customized user profile management system 110 may store data associated with the customer interactions with retail and advertisement website resources 108 in database 118 in association with respective account numbers and/or identifiers and/or customized user profiles. As described above, the data may be fetched and used to determine customer interests for each customized user profile. The customized user profile management system 110 may be used to generate customized user profiles for customers and/or users. In one example, customers may provide preferences and other customization data for association with a generated account. In some examples, the customized user profile management system 110 may automatically monitor user actions associated with each customized user profile and automatically change or adjust interests associated with the respective customized user profiles.

The customized user profile data may be used by the customized user profile management system 110 to better target advertisement, products and product recommendations to customers. In some implementations, the customized user profile management system 110 may provide customized user profile data or interests to a remote advertisement system (not shown) connected to network 102. In turn, the advertisement system may then use customized user profile data or interests to better target advertisements and recommendations to customers. In some examples, the customized user profile management system 110, may determine customized user profile data or interests associated with a particular product and provide the data to a seller device associated with the product. In some implementations, the customized user profile management system 110 may provide promotions, recommendations and/or advertisements that match the first customized user profile data or interests to the user device when, for example, the first customized user profile is active. As described, different advertisements, products, recommendations and/or the like that match the second customized user profile may be provided to the user device when the second customized user profile is active Illustrative Device Architecture Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Example Customized User Profiles Creation and Activation

Figure 2A:
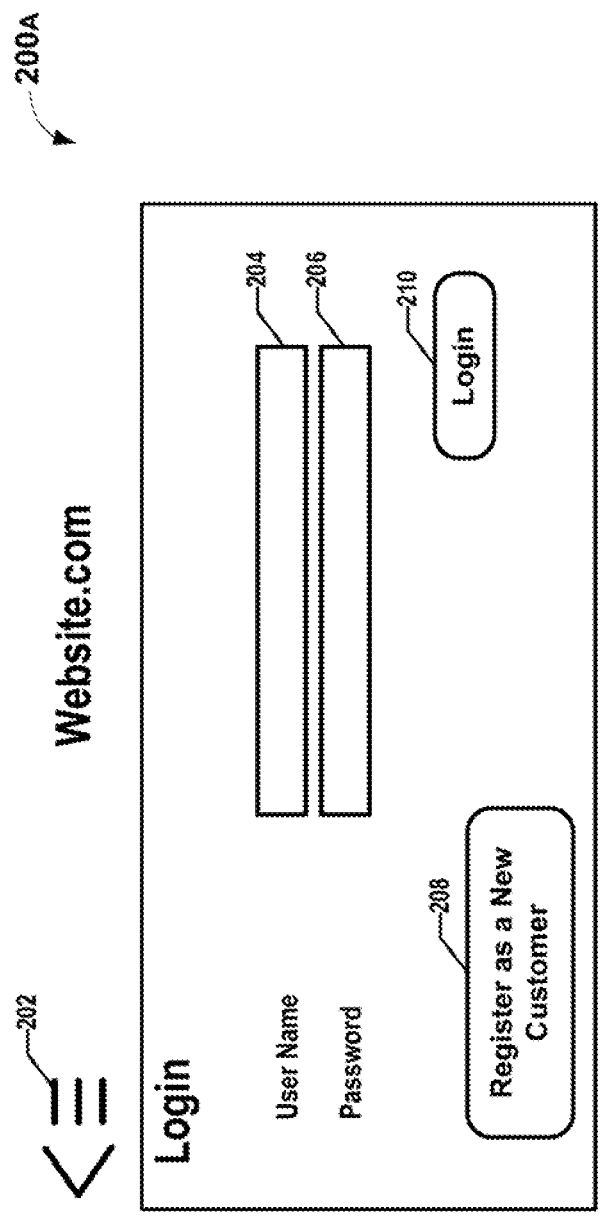
FIGS. 2A-2E depict a Graphical User Interface (GUI) for a device operating according to one or more example embodiments of the disclosure.

FIG. 2A depicts a GUI 200 for providing login credentials according to one or more example embodiments of the disclosure. The depicted GUI 200 is for providing login credentials for an online retail website "website.com". The GUI 200 may include an element 202 that may provide additional options. For example, interaction with element 202 may provide a drop in menu that includes options such as a "recover your password" option. The login GUI may be displayed at a user device 106. A user may provide user input to device106. The user input may include a user name provided at element 204 and a password provided at element 206. Once the user input is provided at elements 204 and 206, a user interaction with element 210 may be provided by user device 106. Alternatively, an interaction with element 208 may reroute the user device to a registration page for completing registration of a new account. During the registration the user may provide personal information, payment information, residence information, shipping information, and/or the like.

Figure 2B:
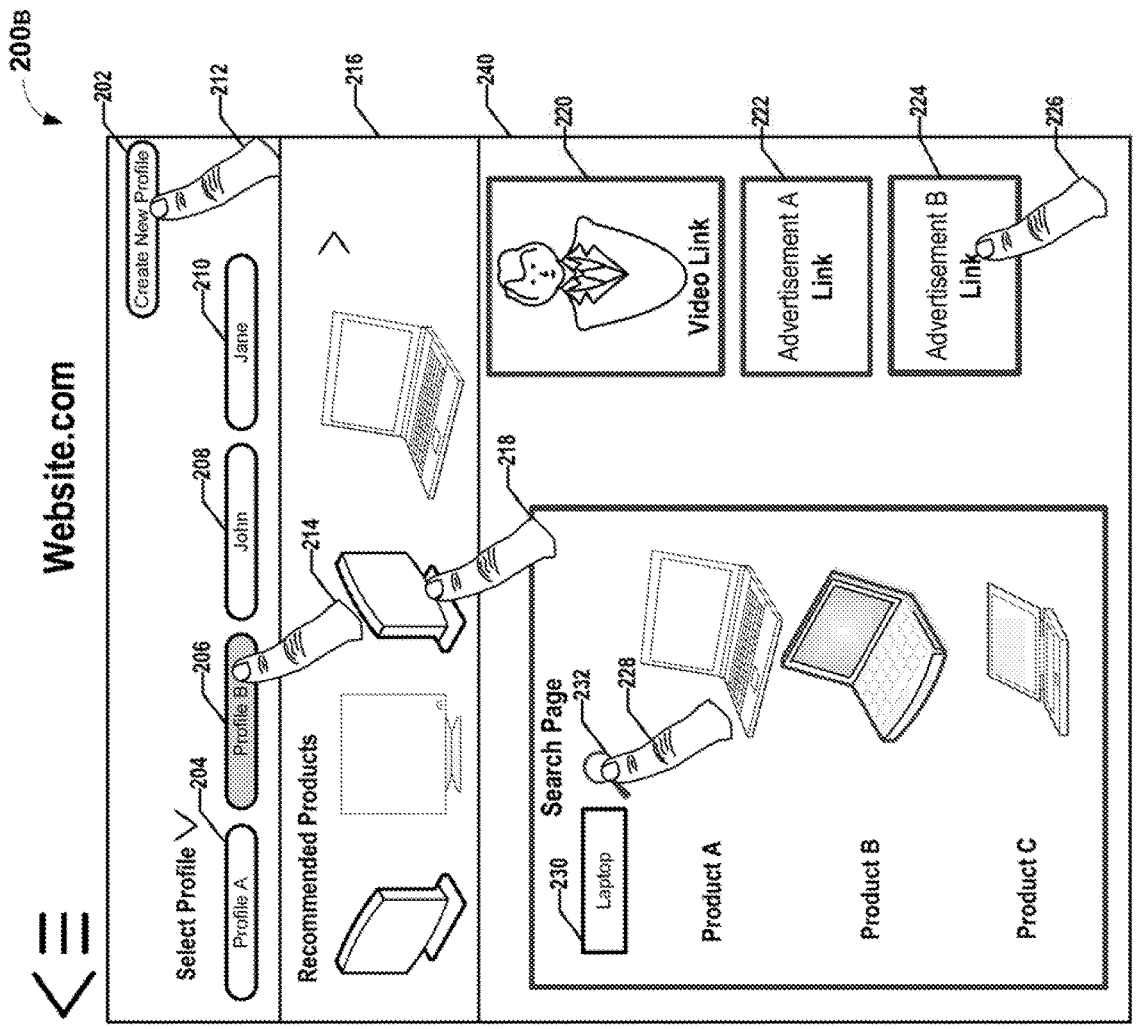

FIG. 2B depicts an online environment for a retail online website in accordance with one or more embodiments of the disclosure. The website "website.com" may provide a variety of products for sale. Once a user provides their login credentials, the user may access their account. In one example, an environment 200B may be presented for display at user device 106. A user may interact with element 202, via interaction 212, to create a new customized profile. The user may provide various preferences, settings and interests when creating a customized profile, as will be discussed in more detail. After logging in the user may also select a customized profile to activate. For example, a user may select at least one of profile 204 "profile A", profile 206 "profile B", profile 208 "John" and profile 210 "Jane." In one example, profile 206 may be associated with a work profile and profile 208 may be associated with a leisure profile. In another example, profile 206 may be associated with a personalized customer persona such as Toddler, and profile 208 maybe associated with a different personalized customer persona such as Teen14-16. In one example, both profile 206 and profile 208 may be associated with a same user, for example, a mother and/or father of a toddler and a teenager. In one example, profile 208 may be associated with a first user while the profile 210 may be associated with the user's spouse. For example, the profile "John" may be a profile for John Smith and the profile "Jane" may be a profile for Jane Smith the spouse of John Smith. In one example, profile 204 may be associated with a child of the user.

A user may interact with profile 206 "profile B," via interaction 214. In turn, recommended products 216 may be identified and provided for display at user device 106 by customized user profile management system 110. The recommended products 216 may be determined based on the selection of profile 206. The user may interact with the recommended products 216 to view respective product pages. For example, a user may interact with a laptop from products 216 via interaction 218 to view a product detail page of the laptop.

In one example, a new mother may pass through a series of different stages in quick succession of short spans (e.g., expecting mom, feeding mom, toddler's mom and/or the like). In some examples, the profile 206 may be a personalized customer persona for the mother that may be associated with being an expecting mom. This association may be performed by the customized user profile management system 110, and may be based on historical data associated with the personalized customer persona as well as historical data associated with the browse and purchase activity of other users having similar interest. In one example, the mother may select a pre-generated user profile persona from a plurality of available pre-generated user profile personas. In one example, the pre-generated user profile personas may be determined based on trends among a plurality of customers and/or among all customers. Generally, trends associated with customers may be clustered based on vector similarity. Pre-generated customized user profile personas may then be created based on data from the cluster having a similarity measure above a threshold. Naturally, profiles clustered in the same cluster are likely to have interest in similar products. For example, expecting mothers are likely to be interested in pregnancy products, while toddler mothers are likely to be interested in toddler toys and/or the like.

In one example, an expected delivery data could be provided by a user and/or determined based on the time elapsed between classifying a customized user profile as an expecting mother and a current date. For example, if a threshold period of time (e.g., 9 month) lapse, the customized user profile may be automatically updated with a feeding mother persona. Similarly, the customized user profile may, in turn, be updated with a toddler mother persona. In one example, promotions provided at, for example, a home screen or a search page may be updated based on the current persona of the user. In a different example, a stamp collector may automatically receive stamp promotions and deals only when activating a customized user profile associated with collecting stamps, which may be based on a pre-generated customized user profile persona for stamp collection. Accordingly, when the user is generally browsing other products while a different customized user profile is activated, stamp promotions may not be presented to a user device of the user or the user. When the user has activated the stamp collection profile, while browsing the user may be presented with advertisements, offers, recommendations based at least in part on historical data of users with similar interest and/or historical data of the user while using the stamp collection profile.

A video advertisement 220 may be displayed at section 240. The video advertisement may be identified by, and in some cases provided by, the customized user profile management system 110 based on activation of profile 206. The video advertisement 220 may route, if selected via user interaction, the user device 106 to a product detail page associated with the advertisement. In one example, the video advertisement 220 may be for a product sold by an entity different from the online retailer "website.com". In one example, the video advertisement 220 may route the user device to a product detail page associated with the website "website.com" and/or a product detail page of a product being offered for sale by the online retailer "website.com".

An advertisement 222 "advertisement A" may be displayed at section 240. The advertisement 222 may be identified by, or in some cases provided by customized user profile management system 110 based on activation of profile 206. In some implementations, the advertisement 222 may be provided by a third party based on data provided to the third party by the customized user profile management system 110. Interaction with the advertisement 222 may route the user device 106 to a product detail page associated with the advertisement 222. In one example, the advertisement 222 may be for a product sold by an entity different from the online retailer "website.com". In one example, the advertisement 222 may route the user device to a product detail page associated with the website "website.com" and/or a product detail page of a product being sold by the online retailer "website.com". Advertisement 224 may be displayed in section 240 similar to advertisement 222. In one example, advertisements 222 and 224 may be advertisements for different products. In one example, advertisements 222 and 224 may be for a first product belonging to a first vertical and a second product belonging to the first vertical respectively. User interaction 226, for example, may route the user device 106 to a product detail page of a product being advertised by advertisement 224.

The user may also provide search terms to search for products being sold by the online retailer "website.com". In one example, the user may provide the search term "laptop" at element 230. In turn, the user may interact with element 232 via interaction 228 to initiate the search. In some cases the results may be filtered on preference or other data associated with a respective activated user profile (e.g., based on interest data associated with the respective activated user profile). In response to the search, a plurality of laptop products (for example, Product A, Product B or Product C) may be displayed as depicted. User interactions with the displayed products may route the user device 106 to a product detail page hosted by the website "website.com". The customized user profile management system 110 may monitor user actions, similar to the above. Data associated with the user actions and/or the user actions may then be stored in database 118 in association with profile 206. The stored data may then be analyzed to determine user interests for each customized user profile. For example, frequent searches within a pre-specified period of time (e.g., 1 month, 3 months, 6 months, 1 year and/or the like) may indicate that profile 206 is associated with interest in purchasing a laptop.

Figure 2C:
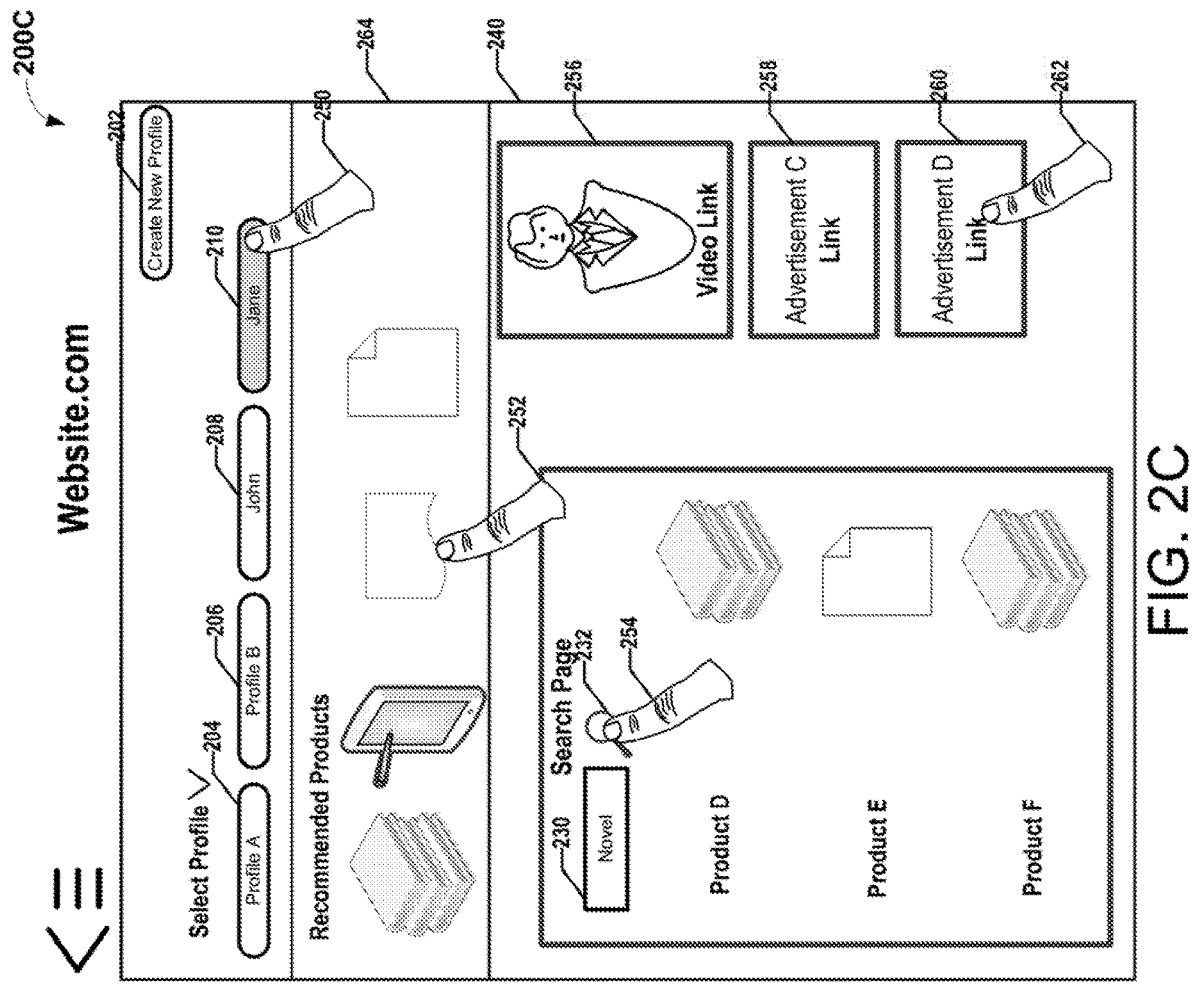

FIG. 2C depicts an online environment for a retail online website in accordance with one or more embodiments of the disclosure. As described the website "website.com" may provide a variety of products for sale. In one example, an environment 200C may be presented for display at user device 106. Following the interactions above the user may still select a different customized profile to activate. For example, a user may select at least one of profile 204 "profile A", profile 206 "profile B", profile 208 "John" and profile 210 "Jane."

A user may interact with profile 210 "Jane," via interaction 250. The profiles "John" and "Jane" may be associated with a family of two. However, both members of the family may use the same billing information and the same account.

In one example, the profile "John" may be associated with a particular body type and/or size of a male (e.g., men large, men medium, men small). Similarly, the profile "Jane" may be associated with a particular body type and/or size of a female (e.g., large, medium, small). Yet another user profile (not shown) may be associated with a particular body type and/or size of a child (e.g., 5-7 years of age). In turn, recommended products 264 may be identified and provided for display at user device 106 by customized user profile management system 110. The customized user profile management system 110, may automatically identify and provide a size suggestion based on the activated profile. In one example, if a selected size does not match the size associated with the profile, a warning may be provided for display at user device 206. The recommended products 264 may be determined based on the selection of profile 210. The user may interact with the recommended products 264 to view respective product pages. For example, a user may interact with a novel from products 264 via interaction 252 to view a product detail page of the novel.

A video advertisement 256 may be displayed at section 240. The video advertisement 256 may be identified by, and in some cases provided by, customized user profile management system 110 based on activation of profile 210. The video advertisement may route the user device 106 to a product detail page associated with the advertisement. In one example, the video advertisement may be for a product sold by an entity different from the online retailer "website.com". In one example, the video advertisement may route the user device to a product detail page associated with the website "website.com" and/or a product detail page of a product being sold by the online retailer "website.com".

An advertisement 258 "advertisement C" may be displayed at section 240. The advertisement 258 may be identified by, and in some cases provided by, customized user profile management system 110 based on activation of profile 206. In some implementations, the advertisement may be provided by a third party based on data provided to the third party by the customized user profile management system 110. Interaction with the advertisement 258 may route the user device 106 to a product detail page associated with the advertisement 258. In one example, the advertisement 258 may be for a product sold by an entity different from the online retailer "website.com". In one example, the advertisement 258 may route the user device to a product detail page associated with the website "website.com" and/or a product detail page of a product being sold by the online retailer "website.com". Advertisement 260 may be displayed in section 240 similar to advertisement 258. In one example, advertisements 258 and 260 may be advertisements for different products. In one example, advertisements 258 and 260 may be for a first product belonging to a first vertical and a second product belonging to the first vertical respectively. User interaction 262 may route the user device 106 to a product detail page of a product being advertised by advertisement 260.

The user may also provide search terms to search for products being sold by the online retailer "website.com". In one example, the user may provide the search term "novel" at element 230. In turn, the user may interact with element 232 via interaction 254 to initiate the search. A plurality of novel products (e.g., printed novels, electronic novels, and/or the like) may be displayed as depicted. User interactions with the displayed products may route the user device 106 to a product detail page hosted by the website "website.com". The customized user profile management system 110 may monitor user actions, similar to the above. Data associated with the user actions and/or the user actions may then be stored in database 118 in association with profile 210. The stored data may then be analyzed to determine user interests for each respective customized user profile, and used by the customized user profile management system 110 for determining relevant recommendations, advertisements, product/service information, etc. based on the activated customized user profile. For example, frequent searches within a pre-specified period of time (e.g., 1 month, 3 months, 6 months, 1 year and/or the like) may indicate that profile 206 is associated with interest in purchasing a laptop.

Figure 2D:
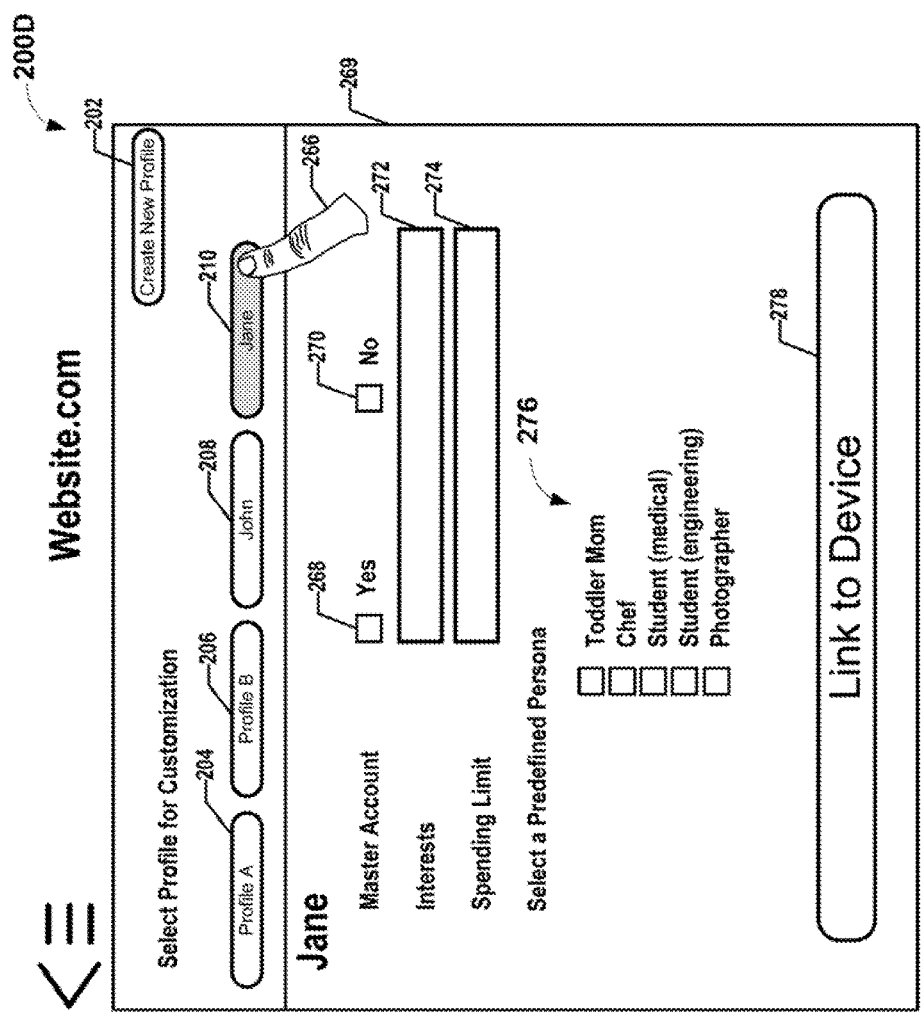

FIG. 2D depicts a webpage for user profile customization, in accordance with one or more embodiments of the disclosure. A user may select to create a new profile via interacting with element 202. The user may also select an existing profile for customization. For example, a user may select at least one of profile 204 "profile A", profile 206 "profile B", profile 208 "John" and profile 210 "Jane" for customization. In the depicted example, profile 210 is selected for customization via interaction 266. Responsive to the selection, section 269 may be displayed. A plurality of customization options may be available for selection and/or activation within section 269. For example, the user may select to indicate that the selected profile 210, is a master account via interaction with element 268. In one example, a master account may have different customization options than a non-master account. In one example, the master account may be associated with a credit card number for billing. In one example, the credit card information for the master account may be used by other user profiles classified as a non-master account. In some implementations, the user may select to indicate that the selected profile 210, is a non-master account via interaction with element 270.

In some examples, the user may provide user input indicative of user interests via element 272. For example, the user may provide input indicative of interest in shoes, cameras, toys, text books, and/or the like. A spending limit may be provided for the selected user profile 210, via element 274. For example, user input may be received at element 274 indicative of a spending limit of $124. In one example, the spending limit may be a monthly spending limit. In a different example, the spending limit may be a yearly spending limit, or based on any other period of time (for example, daily, weekly and/or the like).

Elements 276 may be displayed in section 269. Elements 276 may include a plurality of sub-elements configured for user interaction, each of the sub-elements may correspond to pre-defined user profile persona. For example, as depicted, one persona may be a "toddler mom." The user may interact with a corresponding sub-element of element 276 to activate the "toddler mom" persona. The pre-defined personas may be created by the online retailer "website.com" based on aggregate user data and market trends, as discussed below. Similarly, a user may select at least one of the pre-defined personas "chef," "student (medical)," "student (engineering)," "photographer," and/or the like. In one example, a user may only select one pre-defined persona at a time. In a different example, the user may select multiple personas simultaneously. In such case, a combined persona based on the selected pre-defined persona is generated. For example, selecting a chef and photographer pre-defined personas may lead to products associated with cooking, photos, and/or photos of food products.

In one example, a user may be able to select two or more personas simultaneously for association with a customized profile. In one example, a user may select two or more of the following example personas simultaneously: economical, no used items, healthy diet, vegan. The economical persona may be associated with cheaper products or relatively good discounts. The no used items persona may specify that the user is not interested in used items. The healthy diet persona, for example, may be associated at least with non-fatty food products, while the vegan persona may be associated with a vegan diet. Accordingly, if all the above classification are associated with a particular user profile, the user may receive promotions and/or advertisements for healthy food products that are also vegan products and have an active promotion and/or discount. Suggested products and/or advertisements may be determined based on user interests associated with each persona. The user interests may be determined based on a cluster of two or more users that at least meet a similarity threshold. The interests for the cluster may be determined based on aggregate historical data for the clustered profiles. In one example, a purchase probability may be calculated for the cluster based on the historical data associated with the clustered profiles. For example, based on historical toy purchases associated with a toddler's mother cluster, a probability that members of the cluster may make a similar purchase may be determined. If the probability exceeds a threshold (e.g., 10%) for a particular product, the product may be associated with the profiles of the cluster.

A user may interact with element 278 to link the user profile 210 to a device (e.g., mobile phone, smart tablet and/or the like). For example, user profile 210 may be linked to a particular smart tablet. An option to receive push notifications in association with profile 210 on the tablet may be activated. The tablet may, for example, belong to Jane and may be a private non-work tablet. In turn, the tablet may receive advertisements and/or product suggestions associated with profile 210 at the tablet. The push notifications may not be provided to other devices associated with the master account but not linked to user profile 210. In one example, a particular mobile phone may be linked to profile 208 "John". In such case, John may receive push notifications on the particular mobile phone based on profile 208 and Jane may receive push notifications on the particular tablet based on profile 210. The push notifications may include product suggestions, advertisements, other communications from online retailer and/or the like.

Figure 2E:
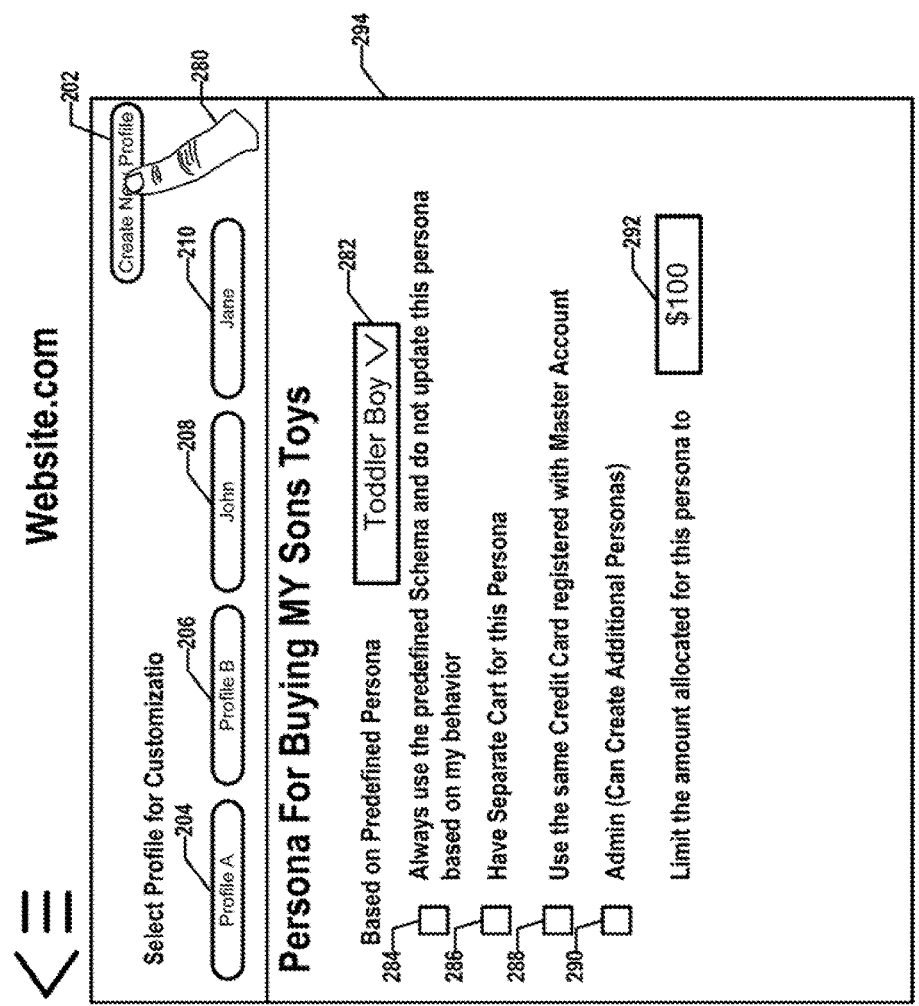

FIG. 2E depicts a webpage for creating a user profile, in accordance with one or more embodiments of the disclosure. A user may select to create a new profile by interacting with element 202 via interaction 280. Section 294 may be presented and/or expanded responsive to interaction 280. In one example element 282 may be a drop down menu. A user may interact with element 280 to view a variety of pre-defined user profile personas (e.g., chef, author, student, athlete, expecting mother, teenager parent and/or the like). A plurality of other options may be activated via section 294. For example element 284 may be receive an interaction to always use the pre-defined schema and not update this user profile based on actions associated with the user profile and/or the master account. For example, when the toddler boy profile is activated, actions associated with the account and/or user profile may be disregarded. For example, a user may browse products relating to tennis. In one example, such browsing actions may be disregarded. In one example, such actions may be logged but not used to alter the user profile preferences associated with the toddler boy user profile.

Element 286 may allow for a separate cart for association with a user profile (e.g., toddler boy profile). For example, items added to a shopping cart while the toddler boy profile is activated may be placed at a first cart and items added to a shopping cart while the profile 210 is activated may be added to a second cart different from the first cart. Interaction with element 288 may allow the user to use the same credit card and/or billing information associated with the master account. Interaction with element 290 may provide admin privileges to the toddler boy user profile. For example, interaction with element 290 may allow the toddler boy user profile to create additional personas. In some cases, parents owning a master account may not provide children associated with the account admin privileges. A spending limit may be provided for the user profile toddler boy as depicted in element 292. For example, a $100 limit may be set for the account. Purchases made in association with the toddler boy account may not exceed the spending limit during a pre-specified threshold of time (e.g., 1 month, 1 year and/or the like). In some examples, a spending limit may only be provided by a master account and/or a user profile having admin privileges.

In one example, products offered by the online retailer may be clustered based on cosine dissimilarities. For example, a first product group cluster may include a first DSLR camera and a point and shoot camera. Similarly, a second product group cluster may include dress shoes and athletic shoes. Historical data for customers may be fetched for over a period of time (e.g., last year). The historical data may include customer sessions. Customer sessions may be clustered into clusters C1, C2 . . . Cp using K-means clustering taking cosine dissimilarity between each session using product group clusters G1, G2 . . . Gn as the dimensions in the calculation cosine similarity. An Example cluster S1 for customer 1 and session 1 is provided in the below:

S1: Customer 1 Session 1

Product Group 1 (DSLR Camera)—Purchase Count=5
Product Group 2 (Camera Lens)—Purchase Count=3
Product Group 3 (Tripods)—Purchase Count=1
Product Group 5 (Shoes)—Purchase Count=1

Similarly, an example cluster S2 for customer 1 and session 2 is provided in the below:

S2: Customer 1 Session 2

Product Group 2 (Camera Lens)—Purchase Count=3
Product Group 3 (Tripods)—Purchase Count=1
In turn an example output cluster is provided below:

C1: Camera Buyers

S1
S2

In one example, the top products may be identified for each output cluster (e.g., DSLR camera, camera lens and/or the like). A label may be associated with the cluster based on the top products (e.g., camera buyers). The largest and/or most active clusters may be identified and used as predefined personas.

In one example, each persona may be associated with a plurality of products groups (e.g., G1, G2 . . . Gn). A probability of a customer buying a product from product group a first group Gx, if the customer made a purchase from a second group Gy, a threshold period of time before (e.g., in the last 7 days, 1 year and/or the like). Pairs of Gx, Gy having a directional ordering and probability value greater than a predefined threshold P-threshold may be identified. Based on the above probability and a customer persona and/or customized user profile a product Gx may be ranked their if the customer purchased the Gy product. For example a customer who buys a DSLR camera has particular probability to buy a lens after a month from the purchase using a "Camera Enthusiast" persona. If the probability is greater than a threshold (e.g., 10%), the lenses may be ranked higher for that specific persona.

Computing Device

Figure 3:
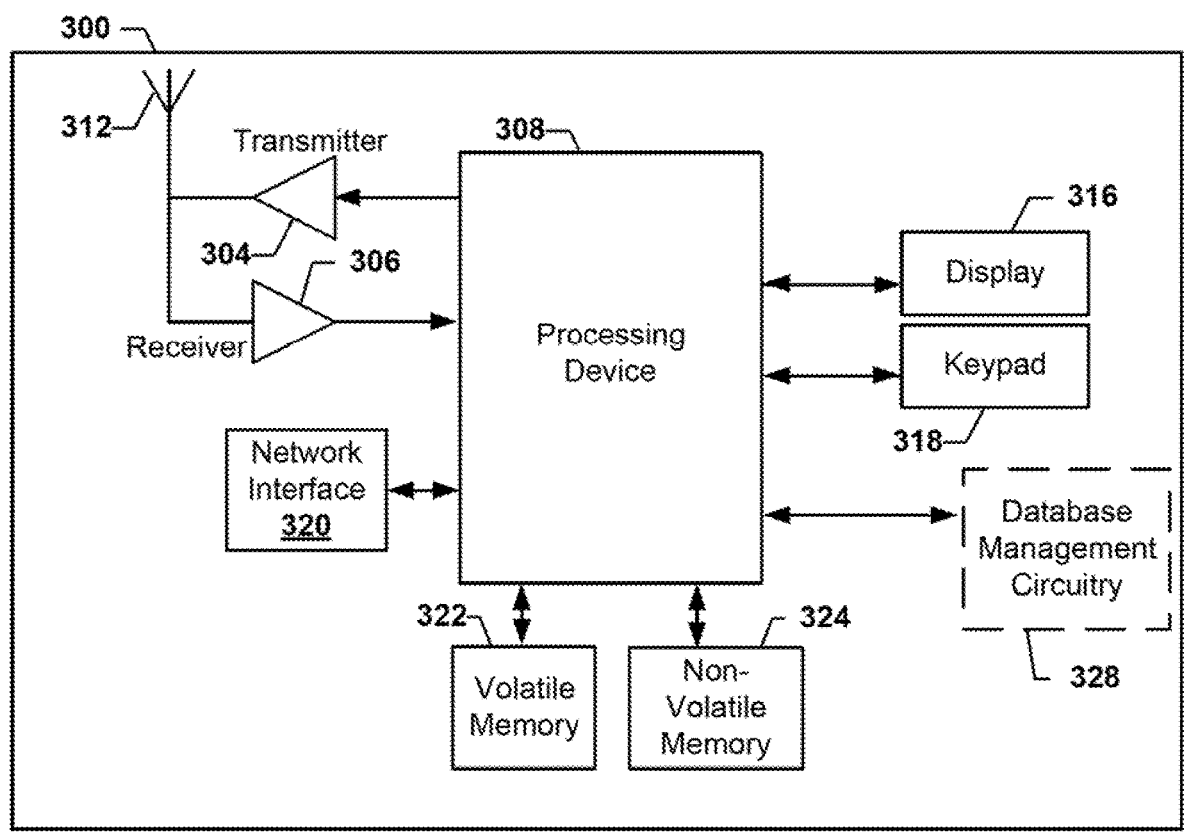
FIG. 3 illustrates an example schematic diagram of a computing device or entity according to one or more example embodiments of the disclosure.

FIG. 3 illustrates an example schematic diagram of a computing device 300 and/or entity according to one or more example embodiments of the disclosure. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The computing device 300 can be operated by various parties and/or automatically. As shown in FIG. 3, the computing device 300 can include an antenna 312, a transmitter 304 (e.g., radio), a receiver 306 (e.g., radio), and a processing device 308 (e.g., CPLDs, microprocessors, multi-core processors, co-processing entities, ASIPs, microcontrollers, and/or controllers) that provides signals to and receives signals from the transmitter 304 and the receiver 306, respectively.

The signals provided to and received from the transmitter 304 and the receiver 306, respectively, may include signaling information in accordance with air interface standards of applicable wireless systems. In this regard, the computing device 300 may be capable of operating with one or more air interface standards, communication protocols, modulation types, and access types. More particularly, the computing device 300 may operate in accordance with any of a number of wireless communication standards and protocols. In a particular embodiment, the computing device 300 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 300 may operate in accordance with multiple wired communication standards and protocols, via a network interface 320.

Via these communication standards and protocols, the computing device 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 300 can also download changes, add-ons, and updates, for instance, to its firmware, software (e.g., including executable instructions, applications, program modules), and operating system.

According to one embodiment, the computing device 300 may include location determining aspects, devices, modules, functionalities, and/or similar words used herein interchangeably. For example, the computing device 300 may include outdoor positioning aspects, such as a location module adapted to acquire, for example, latitude, longitude, altitude, geocode, course, direction, heading, speed, universal time (UTC), date, and/or various other information/data.

In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 300 position in connection with a variety of other systems, including cellular towers, Wi-Fi access points, and/or the like. Similarly, the computing device 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 300 may also comprise a user interface (that can include a display 316 coupled to a processing device 308) and/or a user input interface (coupled to a processing device 308). For example, the user interface may be a user application, browser, user interface, and/or similar words used herein interchangeably executing on and/or accessible via the computing device 300 to interact with and/or cause the display of information. The user input interface can comprise any of a number of devices or interfaces allowing the computing device 300 to receive data, such as a keypad 318 (hard or soft), a touch display, voice/speech or motion interfaces, or other input devices. In embodiments including a keypad 318, the keypad 318 can include (or cause the display of) the conventional numeric (0-9) and related keys (#, *), and other keys used for operating the computing device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 300 can also include volatile memory 322 and/or non-volatile memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 300. As indicated, this may include a user application that is resident on the respective device or accessible through a browser or other user interface for communicating with various other computing entities. As will be recognized, these architectures and descriptions are provided for example purposes only and are not limited to the various embodiments.

The computing device 300 may optionally include database management circuitry 328. In one implementation, the database management circuitry 328 may be embodied as software executed on the processing device 308. In a different implementation, the database management circuitry 328 may be a processing device in communication with the processing device 308. The database management circuitry 328 may be responsible for managing one or more databases. In one implementation, the database management circuitry 328 may store and maintain a tree (e.g., b-tree and/or the like) in association with each database. For example, the tree may be used by the database management circuitry 328 to facilitate searching for data in a database. The database management circuitry 328 may receive and process search requests via the network interface 320.

Example Customized User Profile Management and Analysis Service

As used herein, the term "customized user profile management and analysis service" may include a service that is accessible via one or more computing devices and that is operable to monitor, analyze customer actions and/or behavior and store data associated with the customer actions and analysis in a database. The customized user profile management and analysis service may also facilitate retrieval of data from the database storage devices. The data may be retrieved by the server 410 during and/or after performance of the analysis. The stored data may be backed up in one or more additional storage devices to ensure that the data is preserved. The stored data may be provided to one or more remote systems for further analysis or for targeting advertisements and/or products to customers.

As used herein, the terms "client" and "seller" may be used interchangeably and may include, but are not limited to, a business owner, shopkeeper, tradesperson, vendor, operator, entrepreneur, agent, dealer, organization or the like that is in the business of providing a good, service or experience to a consumer, facilitating the provision of a good, service or experience to a consumer, and/or otherwise operating in the stream of commerce. The "client" and "seller" may also include individuals, households, and/or the like. As used herein, the terms "customer" and "user" may be used interchangeably and may include, without limitation, individuals, groups of individuals, corporations, other merchants, and the like.

As used herein, the term "communication channel data" refers to electronic information relating to the particular device or communication channel upon which a client communicates with the database storage and management service. In this regard, communication channel data may include the type of device used by the client (e.g., smartphone, phone, desktop computer, laptop, netbook, tablet computer), the Internet Protocol (IP) address of the device, the available bandwidth of a connection, login credentials used to access the channel (e.g., a user account and/or password for accessing results), or any other data pertaining to the communication channel between the customer engagement monitoring service and an entity external to the customer engagement monitoring service.

Figure 4:
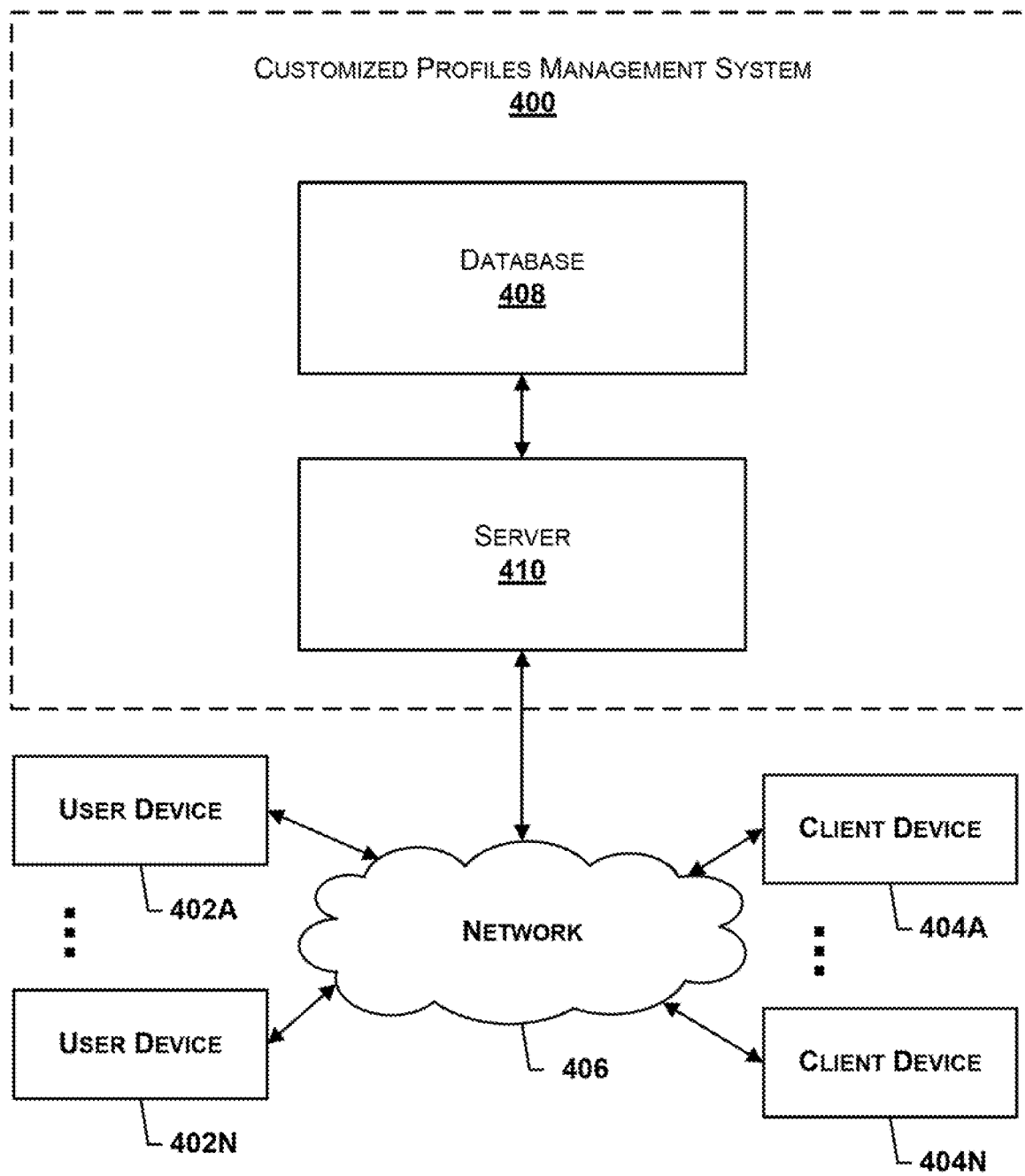
FIG. 4 illustrates an example environment in which computing devices or entities may operate according to one or more example embodiments of the disclosure.

FIG. 4 discloses an example customized user profile management and analysis service 400 within which embodiments of the present disclosure may operate. Clients may access a customized user profile management and analysis service 400 via a network 406 (e.g., the Internet or the like) using one or more user devices 402A-402N or one or more client devices 404A-404N. Moreover, the customized user profile management and analysis service 400 may comprise a server 410 in communication with a database 408. Other communication channels may also be formed between the client devices 404A-404N, the user devices 402A-402N, the database 408 and/or the like.

The server 410 may be embodied as a computer or computers as described herein (e.g., the computing device 300). The server 410 may provide for receiving electronic data from various sources including, but not necessarily limited to, the user devices 402A-402N or one or more client devices 404A-404N. For example, the server 410 may be operable to receive and process advertisement data and/or product data provided by the client devices 404 for retail or display at a particular retail website. Similarly, the server 410 may facilitate fetching of the stored data by the client devices 404 and/or the user devices 402. In some examples, the data may be customized user profile data. The server 410 may also track and log information associated with storage and retrieval. The server 410 may also be responsible for performing the customer monitoring and analysis operations described herein, and for storing/fetching results in/from the database 408.

The database 408 may be embodied as a data storage device such as a Network Attached Storage (NAS) device or devices, or as a separate database server or servers. The database 408 includes information accessed and stored by the server 410 to facilitate the operations of the customer engagement monitoring service 400. For example, the database 408 may include, without limitation, user account credentials for system administrator privileges, access operations, data modifying operations and/or the like.

The user devices 402A-402N and the client devices 404A-404N may be any computing device as described above and operated by a user. Electronic data transferred between the server 410 and the user devices 402A-402N and the client devices 404A-404N may be provided in various forms and via various methods. For example, the user devices 402A-402N and the client devices 404A-404N may include desktop computers, laptop computers, smartphones, netbooks, tablet computers, wearables, and the like. The information may be provided through various sources on these devices.

In embodiments where a user device 402 or a client device 404 is a mobile device, such as a smartphone or a tablet, the user device 402 or the client device 404 may execute an application or an "app" to interact with the customer engagement monitoring service 400. Such apps are typically designed to execute on mobile devices, such as tablets or smartphones. For example, an app may be provided that executes on mobile device operating systems. These platforms typically provide frameworks that allow apps to communicate with one another and with particular hardware and software components of mobile devices. Communication with hardware and software modules executing outside of the app may be provided via application programming interfaces (APIs) provided by the mobile device operating system.

Additionally or alternatively, the user device 402 or the client device 404 may interact through the customized user profile management and analysis service 400 via a web browser. As yet another example, the user device 402 or the client device 404 may include various hardware or firmware designed to interface with customer engagement monitoring service 400 (e.g., where the user device 402 or the client device 404 is a purpose-built device offered for the primary purpose of communicating with the engagement monitoring service 400). In some implementations, the customized user profile management and analysis service may track and log user interactions with particular retail websites or platforms. In some implementations, a remote system (not shown) may track and log such information and provide via network 406 to the customized user profile management system 400. Analysis may be performed to determine user interests. For example, historical data for the first user profile may be analyzed over a threshold period of time (e.g., 1 year). Based on the historical data a likelihood or probability of a purchase associated with the first customized user profile may be determined for a plurality of products. The plurality of products may be ranked based on the determined likelihood. Advertisements and promotions associated with one or more top ranked products may be provided to the user device, while the first customized user profile is activated.

Illustrative Processes

Figure 5:
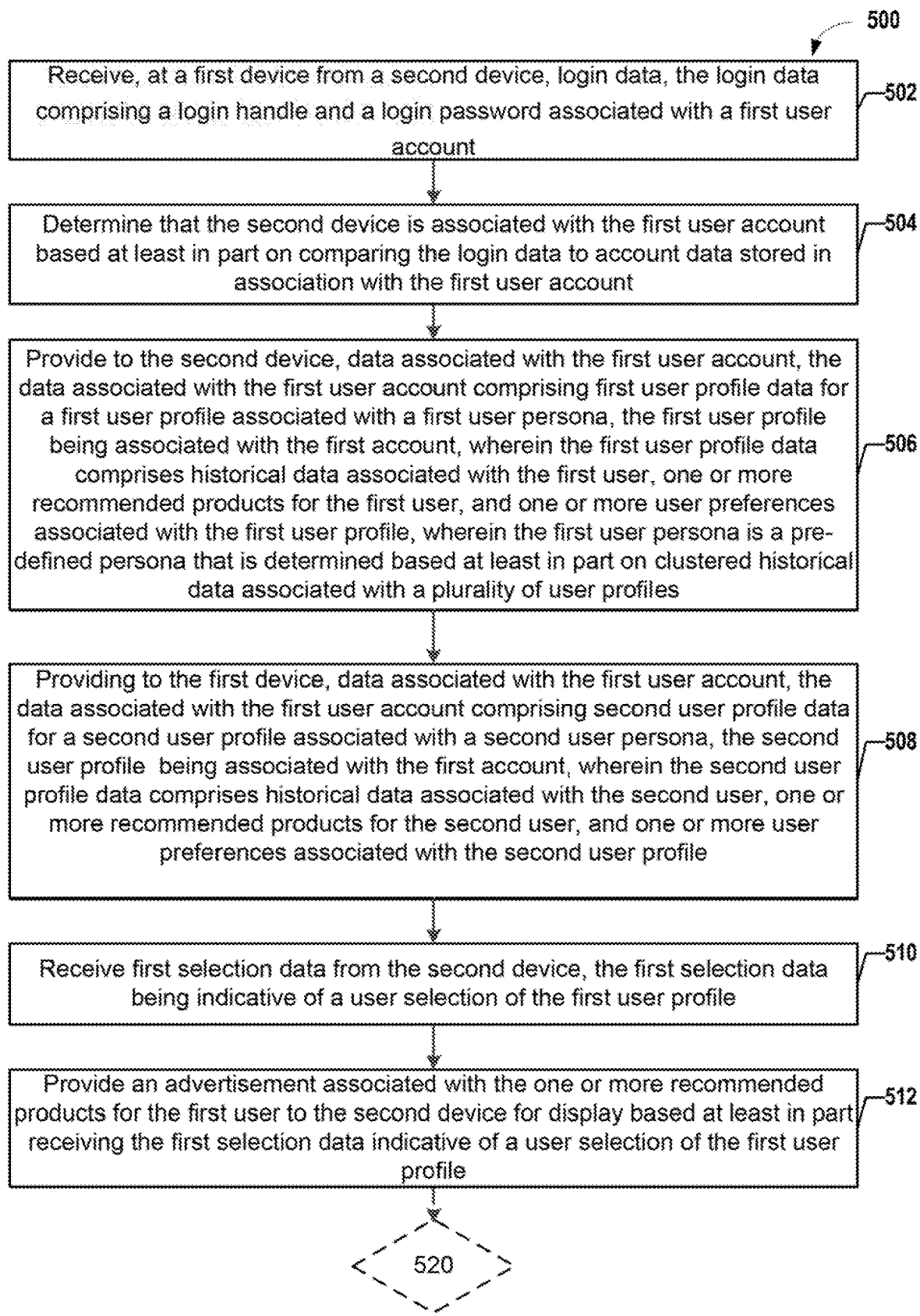
FIGS. 5-9 are flowcharts illustrating various procedures and operations, for providing customized user profiles, that may be completed in accordance with various embodiments of the disclosures.

FIG. 5 is a flowchart of an example process 500 in accordance with various embodiments of the disclosure. The process 500 may be implemented by user device 106 (such as computing device 300) and/or customized user profile management system 110, in an illustrative embodiment. In one embodiment the steps of process 500 may be executed by, at least in part, the customized user profile system 400. In a different embodiment the steps of process 500 may be executed by a user device 106. The process 500 may begin with receiving, at a first device from a second device, login data, the login data comprising a login handle and a login password associated with a first user account (502). For example, an online retail service and/or customized user profile management system 110 may receive from user device 106 a login request comprising user name data and password data. In one example, the user device 106 is a mobile device (e.g., mobile phone, tablet and/or the like) and the customized user profile management system 110 may be, for example, one or more servers.

The process 500 may continue with determining that the second device is associated with the first user account based at least in part on comparing the login data to account data stored in association with the first user account (504). For example, the customized user profile management system 110 or retail service may compare the login name and password to stored login and password data associated with the account. Based on the comparison the customized user profile management system 110 or retail service may grant access to the account. For example, if the received login data matches the stored login data, access to the account may be granted.

The process 500 may continue with providing to the second device, data associated with the first user account, the data associated with the first user account comprising first user profile data for a first user profile associated with a first user, the first user profile being associated with the first account, wherein the first user profile data comprises historical data associated with the first user, one or more recommended products for the first user, and one or more user preferences associated with the first user profile, wherein the first user persona is a pre-defined persona that is determined based at least in part on clustered historical data associated with a plurality of user profiles (506). For example, customized user profile management system 110 may provide user profile data for display at the user device 106. A user may provide input to the mobile device indicative of selecting a first user profile included in the user profile data. The user profile data may include historical data associated with the first user profile and/or user. In one example, the user profile data may include recommended products for the user and/or for the first user profile. In one example, the user profile data may include one or more preferences of the first user and/or preferences associated with the first user profile. In one example, the user profile data may be based on a pre-defined user profile and/or persona as described herein.

The process 500 may continue with providing to the second device, data associated with the first user account, the data associated with the first user account comprising second user profile data for a second user profile associated with a second user, the second user profile being associated with the first account, wherein the second user profile data comprises historical data associated with the second user, one or more recommended products for the second user, and one or more user preferences associated with the second user profile (508). For example, customized user profile management system 110 may provide user profile data for display at the user device 106. The user profile data may be for a different user profile than the above. A user may provide input to the mobile device indicative of selecting a second profile included in the user profile data. The user profile data may include historical data associated with the second user profile and/or user. In one example, the user profile data may include recommended products for the user and/or for the second user profile. In one example, the user profile data may include one or more preferences of the second user and/or preferences associated with the second user profile. In one example, the process 500 may continue with providing to the second device a first indication of the first user profile and a second indication of the second user profile for display at the second device. For example, the process the process 500 with providing to a user device 106 data indicative user profiles (e.g., 204-210) for display. A user interaction may then select one of the displayed profiles.

The process 500 may continue with receiving first selection data from the second device, the first selection data being indicative of a user selection of the first user profile (510). For example, user device 106 may provide to customized user profile management system 110 data indicative of a user selection of one of the first or the second user profiles. In turn, the customized user profile management system 110 may receive selection data from user device 106. Responsive to receiving the selection data, the customized user profile management system 110 may activate a respective user profile. For example, the first user profile may be activated.

The process 500 may continue with providing an advertisement associated with the one or more recommended products for the first user to the second device for display based at least in part on receiving the first selection data indicative of a user selection of the first user profile (512). For example, the customized user profile management system 110 may provide user device 106 with an advertisement for presentation based on the selected user profile. For example, an advertisement associated with the first user profile may be provided to user device 106. In one example, the advertisement may be selected based at least in part on historical data associated with the first user, one or more recommended products for the first user, and/or one or more user preferences associated with the first user profile. Similarly, responsive to a selection of the first user profile, an advertisement may be selected to be provided to user device 106 based on similar attributes associated with the first user profile.

Figure 6:
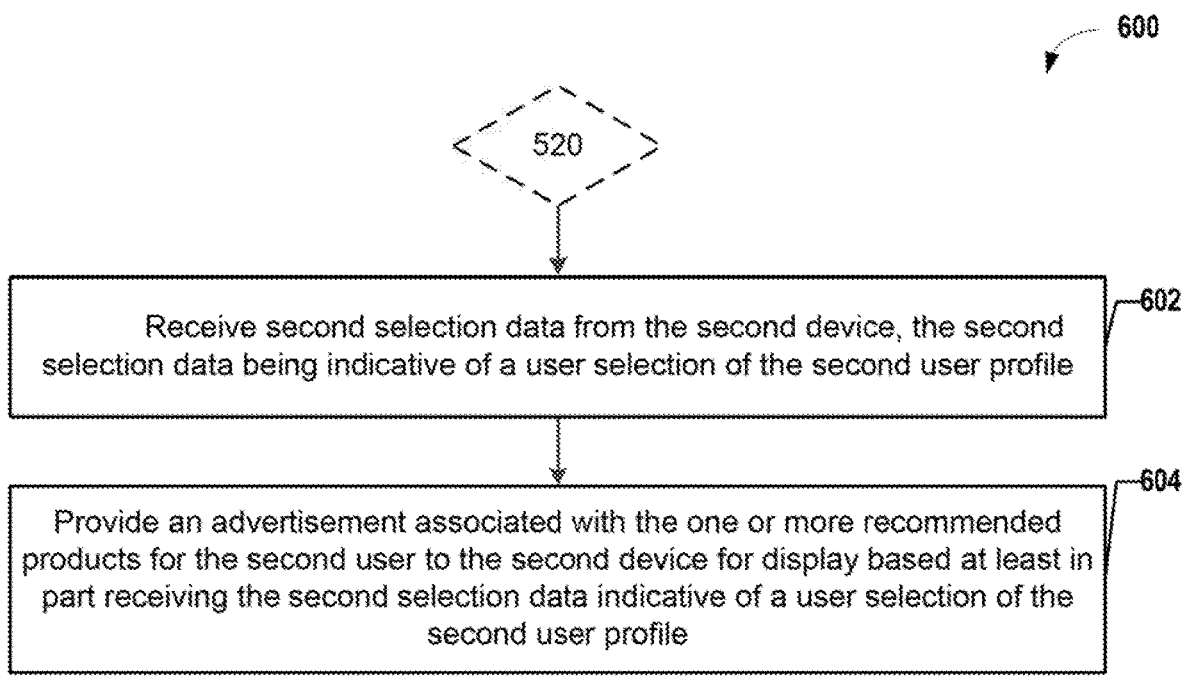

The process 500 may optionally continue with steps of process 600. FIG. 6 is a flowchart of an example process 600 in accordance with various embodiments of the disclosure. The process 600 may begin with receiving second selection data from the second device, the second selection data being indicative of a user selection of the second user profile (602). For example, a selection of the second user profile may be received at customized user profile management system 110. In turn, the process 600 may continue with providing an advertisement associated with the one or more recommended products for the second user to the second device for display based at least in part on receiving the second selection data indicative of a user selection of the second user profile (604). For example, an advertisement associated with the second user profile may be provided to the user device 106. In one example, the advertisement may be selected based at least in part on historical data associated with the second user, one or more recommended products for the second user, and/or one or more user preferences associated with the second user profile.

Figure 7:
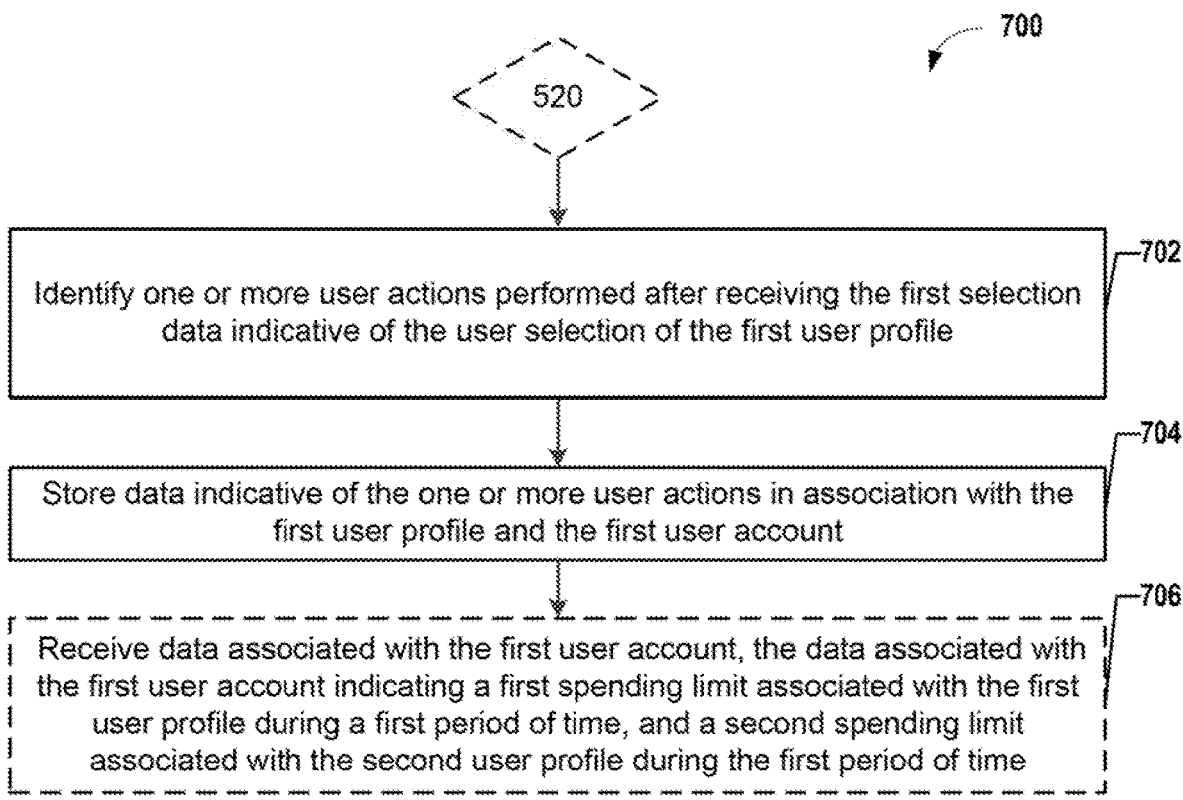

The process 500 may optionally continue with the steps of process 700. FIG. 7 is a flowchart of an example process 700 in accordance with various embodiments of the disclosure. The process 700 may begin with identifying one or more user actions performed after receiving the first selection data indicative of the user selection of the first user profile. (702). For example, the customized user profile management system may track and log user actions in association with a respective selected user profile. The process 700 may continue with storing data indicative of the one or more user actions in association with the first user profile and the first user account (704). For example, actions performed after activating the user profile 210 "Jane" be tracked and stored in association with user profile 210. In one implementation, the process 700 may continue with the optional step 706 shown in phantom. The process 700 may continue with receiving data associated with the first user account, the data associated with the first user account indicating a first spending limit associated with the first user profile during a first period of time, and a second spending limit associated with the second user profile during the first period of time (706). For example, customized user profile management system 110 may receive from user device 106 data setting spending limits for one or more user profiles (e.g., user profiles 204-210). In one example, user device 106 may provide spending limit data after activating a user profile having admin privileges, as described above. In one example, the spending limit may be a monthly spending limit. In a different example, the spending limit may be a yearly spending limit. In one example, once a first user profile reaches its spending limit, additional purchases may not be permitted while the first user profile is activated. However, other profiles associated with the same account may be allowed to complete purchases.

Figure 8:
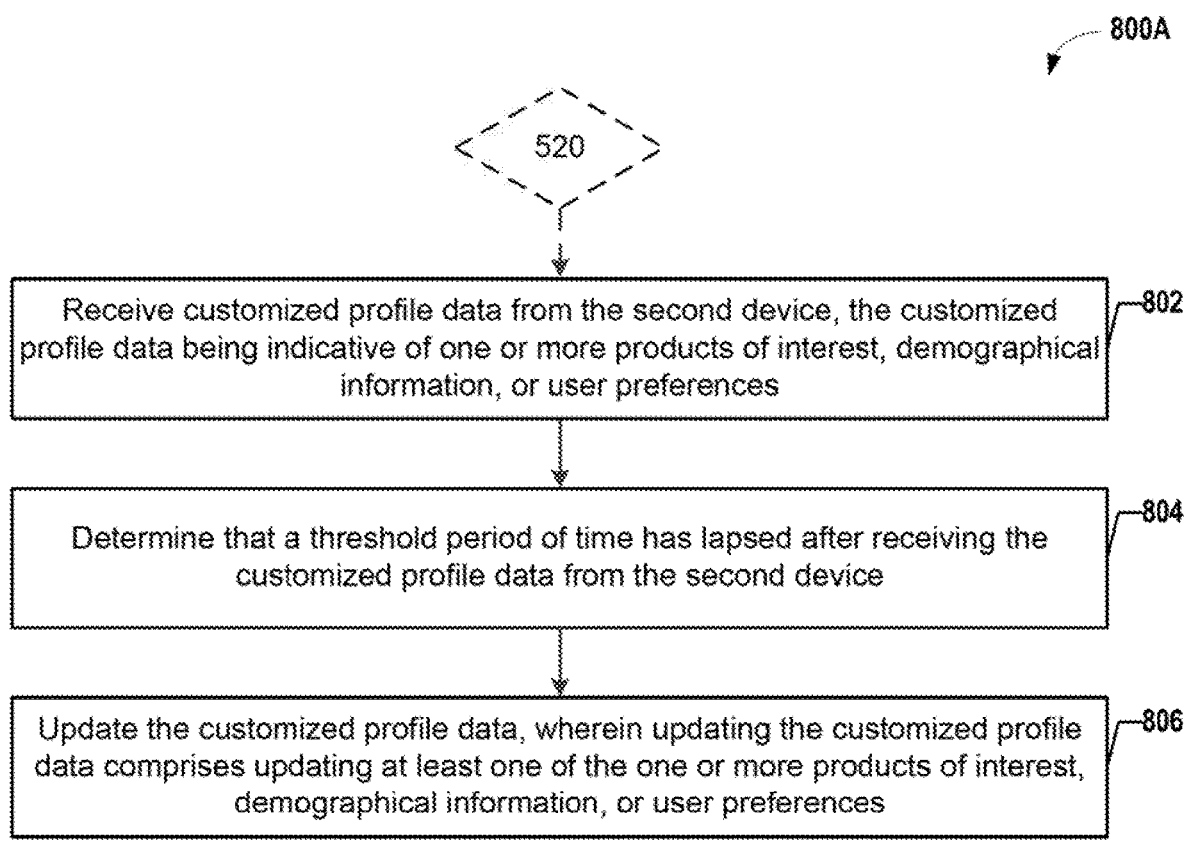

The steps of process 500 may optionally continue with the steps of process 800. FIG. 8 is a flowchart of an example process 800 in accordance with various embodiments of the disclosure. The process 800 may begin with receiving customized profile data from the second device, the customized profile data being indicative of one or more products of interest, demographical information, or user preferences (802). For example, the customized user profile management system 110 may receive customization data in association with a user profile as described herein. For example, an expecting mother may provide information indicative of interests in pregnancy products. The process 800 may continue with determining that a threshold period of time has lapsed after receiving the customized profile data from the second device (804). For example, the customized user profile management system may determine that a period of 9-months lapsed after receiving the customization information.

In turn, the process 800 may continue with updating the customized profile data, wherein updating the customized profile data comprises updating at least one of the one or more products of interest, demographical information, or user preferences (806). For example, the expecting interests associated with the expecting mother may be updated to remove the interest in pregnancy products. In one example, the user profile association with an expected mother may be removed. In one example, the interest may be updated based on historical information to an interest in cameras.

Figure 9:
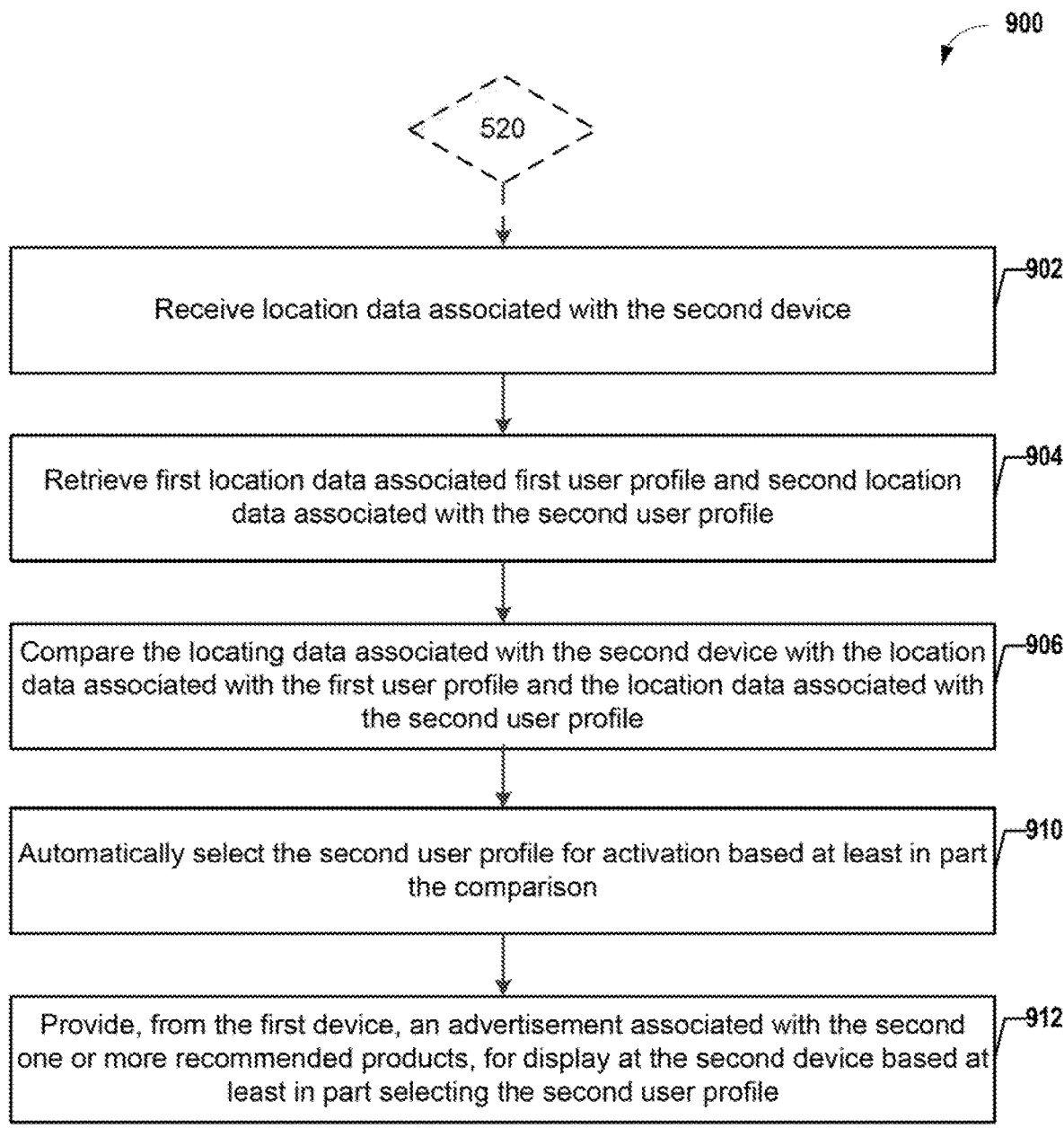

The process 500 may optionally continue with the steps of process 900. FIG. 9 is a flowchart of an example process 900 in accordance with various embodiments of the disclosure. The process 900 may begin with receiving location data associated with the second device (902). For example, the user device 106 may provide GPS data to customized user profile management system 110. The process 900 may continue with retrieving first location data associated with the first user profile and second location data associated with the second user profile (904). For example, the customized user profile management system 110 may fetch location data associated with a user account from database 118. In one example, as described above, a first location may be associated with a first user profile associated with the account and a second location may be associated with a second user profile associated with the account.

The process 900 may continue with comparing the locating data associated with the second device with the location data associated with the first user profile and the location data associated with the second user profile (906). For example, the location of the user device may be compared to the first location and the second location to determine whether the device is within the first location or the second location. In one example, the first and second locations may be defined by geo-fences. In turn, the process 900 may continue with automatically selecting the second user profile for activation based at least in part on the comparison (908). For example, responsive to determining that the user device is within a second geo-fence associated with the second location, the customized user profile management system 110 may automatically select the second user profile.

Figure 10:
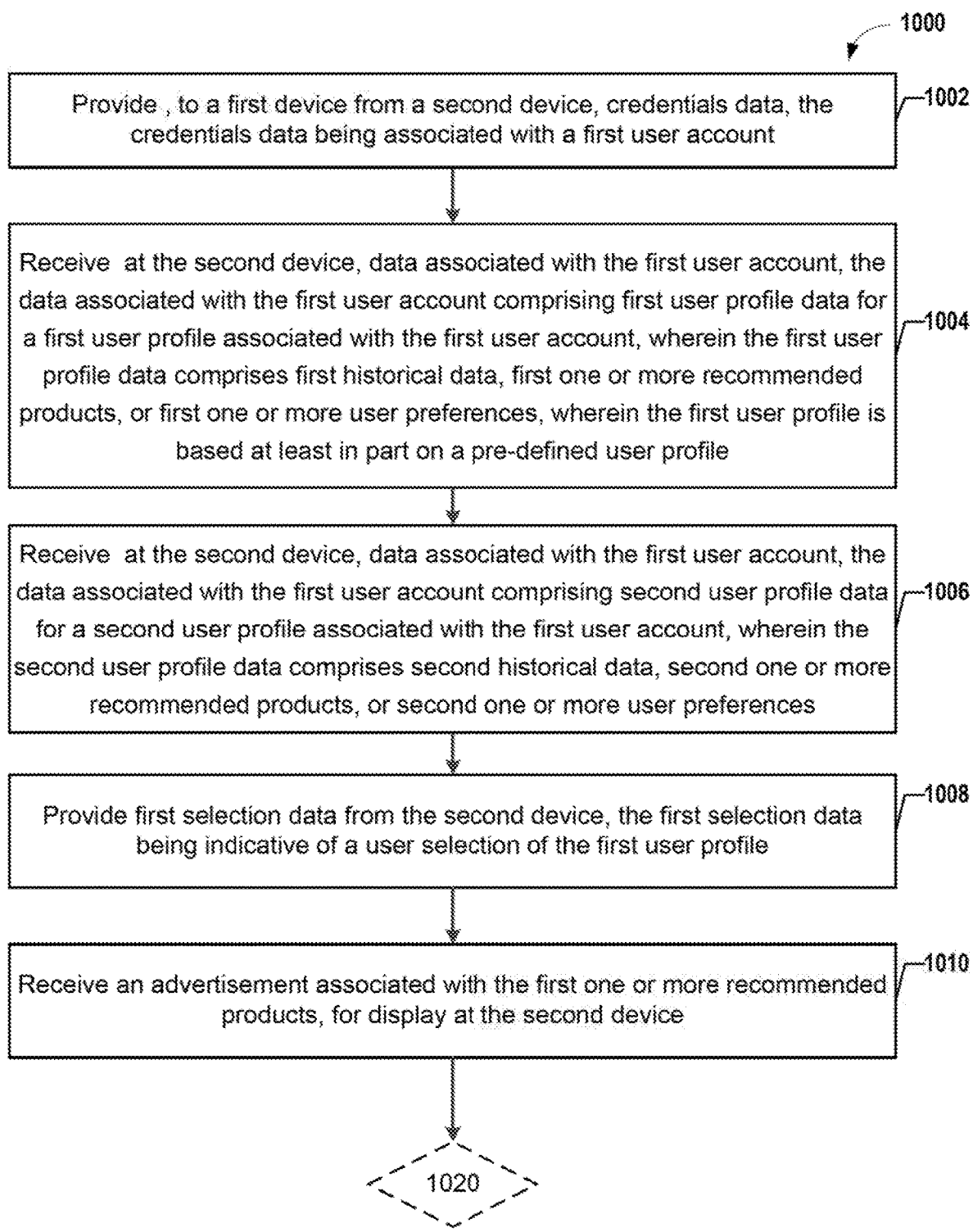
FIGS. 10-11 are flowcharts illustrating various procedures and operations, for receiving product suggestions based on customized user profiles, that may be completed in accordance with various embodiments of the disclosure.

Finally, the process 900 may continue with providing, from the first device, an advertisement associated with the second one or more recommended products, for display at the second device based at least in part on selecting the second user profile (910). For example, the customized user profile management system 110 may provide an advertisement to user device 106 based on data associated with the second user profile, as described herein. FIG. 10 is a flowchart of an example process 1000 in accordance with various embodiments of the disclosure. The process 1000 may be implemented by user device 106 (such as computing device 300) and/or customized user profile management system 110, in an illustrative embodiment. In one embodiment the steps of process 1000 may be executed by, at least in part, the customized user profile system 400. In a different embodiment the steps of process 1000 may be executed by a user device 106. Yet in a different embodiment, the process 1000 may be performed by one or more servers (e.g., computing device 300). The process 1000 may begin with providing, to a first device from a second device, credentials data, the credentials data being associated with a first user account (1002). For example, as described above, user device 106 may provide login data (e.g., login name and login password and/or the like) to the retail service and/or customized user profile management system 110.

The process 1000 may continue with receiving by the second device, data associated with the first user account, the data associated with the first user account comprising first user profile data for a first user profile associated with the first user account, wherein the first user profile data comprises first one or more recommended products, or first one or more parameters associated with user preferences, wherein the first user profile is based at least in part on a pre-defined user profile (1004). For example, user device 106 may receive first user profile data similar to the first user profile data discussed above. The process 1000 may then continue with receiving by the second device, data associated with the first user account, the data associated with the first user account comprising second user profile data for a second user profile associated with the first user account, wherein the second user profile data comprises second one or more recommended products, or second one or more parameters associated with user preferences (1006). For example, user device 106 may receive second user profile data similar to the second user profile data discussed above.

The process 1000 may continue with providing first selection data to the first device, the first selection data being indicative of a user selection of the first user profile (1008). For example, the user device 106 may provide, based on user input, selection data indicative of a selection of the first user profile associated with the first user profile data. In turn, the process 100 may continue with receiving an advertisement associated with the first one or more recommended products, from the first device for display at the second device (1010). For example, the user device 106 may receive an advertisement based on the first user profile and/or the first user profile data. In one example, the advertisement may be selected based on criteria associated with the first user profile.

Figure 11:
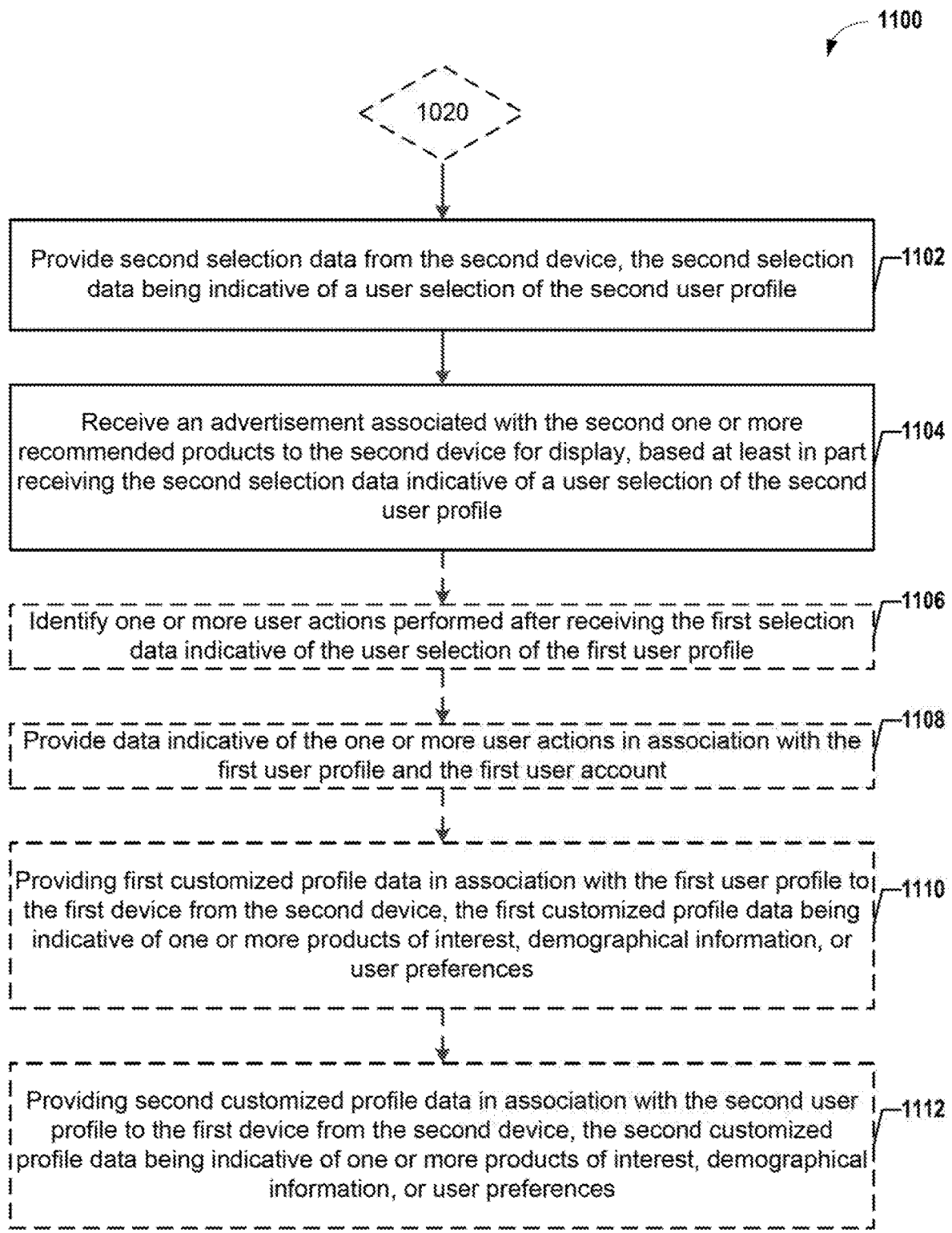

The process 1000 may optionally continue with the steps of process 1100. FIG. 11 is a flowchart of an example process 1100 in accordance with various embodiments of the disclosure. The process 1100 may begin with providing second selection data to the first device, the second selection data being indicative of a user selection of the second user profile (1102). For example, the customized user profile management system 110 may receive from user device 106, data indicative of a selection of the second user profile. The process 1100 may then continue with receiving an advertisement associated with the second one or more recommended products from the first device for display at the second device based at least in part on receiving the second selection data indicative of a user selection of the second user profile (1104). For example, the user device 106 may receive an advertisement responsive to the selection. In one example, the advertisement may be selected based on the second user profile and/or the second user profile data.

The process 1100 may optionally continue with the optional step 1106 shown in phantom. The process 1100 may continue with identifying one or more user actions performed after receiving the first selection data indicative of the user selection of the first user profile (1106). For example, user device 106 may track and log actions performed by the user after activating a respective user account. In turn, the process 1100 may continue with providing to the first device, data indicative of the one or more user actions for storage in association with the first user profile and the first user account (1108). For example, the user device 106 may provide to the customized user profile management system 110 data comprising one or more user actions and an identifier for the respective user profile. In one example, the customized user profile management system 110 may store the received data in database 118 in association with the respective profile identifier.

The process 1100 may continue with providing first customized profile data in association with the first user profile to the first device from the second device, the first customized profile data being indicative of one or more products of interest, demographical information, or user preferences (1110). For example, the user device 106 may provide customization data for the first user profile, as discussed with references to FIGS. 2E-2D. The process 1100 may then continue with providing second customized profile data in association with the second user profile to the first device from the second device, the second customized profile data being indicative of one or more products of interest, demographical information, or user preferences (1112). For example, the user device 106 may provide customization data for the second user profile, as discussed with references to FIGS. 2E-2D.

It should be understood that the processes, operations, and functionality described above may be performed by or implemented in or by a plurality of systems. For example, the processes, operations, and functionality above may be implemented in batteries, battery powered electronic devices, remote management systems, computing entities, and/or the like. The processes, operations, and functionality may be applied to batteries during operation and/or manufacturing.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, (e.g., a machine-generated electrical, optical, or electromagnetic signal), which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, (e.g., an FPGA (field programmable gate array)) or an ASIC (application-specific integrated circuit). The apparatus can also include, in addition to hardware, code that creates an execution environment for the computer program in question, (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, (e.g., magnetic, magneto-optical disks, or optical disks). However, a computer need not have such devices.

Devices suitable for storing computer program instructions and information/data include all forms of non-volatile memory, media and memory devices, including by way of example semiconductor memory devices, (e.g., EPROM, EEPROM, and flash memory devices); magnetic disks, (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, (e.g., a mouse or a trackball), by which the user can provide input to the computer. Other kinds of devices can be used to provide for interaction with a user as well; for example, feedback provided to the user can be any form of sensory feedback, (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, (e.g., as an information/data server), or that includes a middleware component, (e.g., an application server), or that includes a front-end component, (e.g., a client computer having a graphical user interface or a web browser through which a user can interact with an implementation of the subject matter described herein), or any combination of one or more such back-end, middleware, or front-end components. The components of the system can be interconnected by any form or medium of digital information/data communication, (e.g., a communication network). Examples of communication networks include a local area network (LAN) and a wide area network (WAN), an internetwork (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by a first device from a second device, login data, the login data comprising a login handle and a login password associated with a first user account;
   determining that the second device is associated with the first user account based at least in part on comparing the login data to account data stored in association with the first user account;

determining, by the first device, data associated with the first user account, the data associated with the first user account comprising:
- first user profile data for a first user profile associated with a first user persona, the first user profile being associated with the first user account, wherein the first user profile data comprises historical data associated with the first user, one or more recommended products for the first user, and one or more user preferences associated with the first user profile; and
- second user profile data for a second user profile associated with a second user persona, the second user profile being associated with the first user account, wherein the second user profile data comprises historical data associated with the second user, one or more recommended products for the second user, and one or more user preferences associated with the second user profile, wherein the first user profile is associated with a first geo-fence area and the second user profile is associated with a second geo-fence area;

providing to the second device references of the first user profile and of the second user profile for display at the second device;

receiving first selection data from the second device, the first selection data being indicative of a user selection of the first user profile;

receiving location data associated with the second device;

determining, from the location data, that the second device is within the second geo-fence area;

selecting the second user profile based at least in part on the determination that the second device is within the second geo-fence area;

and providing an advertisement associated with the one or more recommended products for the second user to the second device for display based at least in part on selecting the second user profile.

2. The method of claim 1, further comprising:
identifying one or more user actions performed after receiving the first selection data indicative of the user selection of the first user profile; and
storing data indicative of the one or more user actions in association with the first user profile and the first user account.

3. The method of claim 1, further comprising:
receiving customized profile data from the second device, the customized profile data being indicative of one or more products of interest, demographical information, or user preferences;
determining that a threshold period of time has lapsed after receiving the customized profile data from the second device; and
updating the customized profile data, wherein updating the customized profile data comprises updating at least one of the one or more products of interest, demographical information, or user preferences.

4. The method of claim 1, wherein the first user persona and the second user persona are associated with a first user.

5. A method comprising:
determining, by a first device, first user profile data associated with a first user account, including one or more of historical data, one or more recommended products, or one or more user preferences associated with the first user profile;
determining second user profile data associated with the first user account, including one or more of historical data, one or more recommended products, or one or more user preferences associated with the second user profile, wherein the first user profile and the second user profile each are associated with a respective geo-fence area;

providing to a remote device references of the first user profile and the second user profile;

receiving an indication that a user of the remote device has selected the first user profile;

receiving location data associated with the remote device;

determining from the location data that the remote device is within the geo-fence area associated with the second user profile;

and providing for display by the remote device an advertisement associated with the one or more recommended products associated with the second user profile when the remote device is in the geo-fence area associated with the second user profile.

6. The method of claim 5, further comprising:
identifying one or more user actions performed after receiving the indication that the user of the remote device has selected the first user profile; and
storing data indicative of the one or more user actions in association with the first user profile and the first user account.

7. The method of claim 5, further comprising:
receiving first customized profile data in association with the first user profile, by the first device from the remote device, the first customized profile data being indicative of one or more products of interest, demographical information, or user preferences; and
receiving second customized profile data in association with the second user profile, by the first device from the remote device, the second customized profile data being indicative of one or more products of interest, demographical information, or user preferences.

8. The method of claim 5, further comprising receiving data associated with the first user account, the data associated with the first user account specifying a first spending limit associated with the first user profile during a first period of time, and a second spending limit associated with the second user profile during the first period of time.

9. The method of claim 5, further comprising receiving by the first device, first data, the first data including a request to associate the first user profile with a second remote device and associate the second user profile with a third remote device.

10. The method of claim 5, further comprising receiving by the first device a request to merge the first user profile with the second user profile.

11. A system comprising:
a data processing apparatus; and
a first memory in data communication with the data processing apparatus and storing instructions executable by the data processing apparatus that upon such execution cause the data processing apparatus to perform operations comprising:
determining first user profile data associated with a first user account, including one or more of historical data, one or more recommended products, or one or more user preferences associated with the first user profile;
determining second user profile data associated with the first user account, including historical data, one or more recommended products, or one or more user preferences associated with the second user profile, wherein the first user profile and the second user profile each are associated with a respective geo-fence area;

providing references of the first user profile and of the second user profile to a remote device;

receiving an indication that a user of the remote device has selected the first user profile;

receiving location data associated with the remote device;

determining from the location data that the remote device is the geo-fence area associated with the second user profile;

selecting the second user profile based at least in part on the determination that the remote device is within the geo-fence area associated with the second user profile;

and providing, for display by the remote device, an advertisement associated with the one or more recommended products associated with the second user profile when the remote device is in the geo-fence area associated with the second user profile.

12. The system of claim 11, wherein the data processing apparatus is further configured to execute the instructions to cause the data processing apparatus to perform operations further comprising:

receiving, from the remote device, credentials data associated with a first user account; and determining that the remote device is associated with the first user account based at least in part on comparing the credentials data to account data stored in association with the first user account.

13. The system of claim 12, wherein the data processing apparatus is further configured to execute the instructions to cause the data processing apparatus to perform operations further comprising:

identifying one or more user actions performed after receiving the indication that the user of the remote device has selected the first user profile; and storing data indicative of the one or more user actions in association with the first user profile and the first user account.

14. The system of claim 12, wherein the data processing apparatus is further configured to execute the instructions to cause the data processing apparatus to perform operations further comprising:

receiving customized profile data from the remote device, the customized profile data being indicative of one or more products of interest, demographical information, or user preferences;

determining that a threshold period of time lapsed after receiving the customized profile data from the remote device; and updating the customized profile data, wherein updating the customized profile data comprises updating at least one of the one or more products of interest, demographical information, or user preferences.

15. The system of claim 12, wherein the data processing apparatus is further configured to execute the instructions to cause the data processing apparatus to perform operations further comprising receiving data associated with the first user account, the data associated with the first user account specifying a first spending limit associated with the first user profile during a first period of time, and a second spending limit associated with the second user profile during the first period of time.

16. The system of claim 12, wherein the data processing apparatus is further configured to execute the instructions to cause the data processing apparatus to perform operations further comprising receiving, from the remote device, first data, the first data being a request to associate the first user profile with a second remote device and associate the second user profile with a third remote device.

17. The system of claim 12, wherein the data processing apparatus is further configured to execute the instructions to cause the data processing apparatus to perform operations further comprising:

retrieving the location data.

* * * * *